United States Patent [19]

Miyazawa et al.

[11] Patent Number: 5,479,380
[45] Date of Patent: * Dec. 26, 1995

[54] ULTRASONIC MOTOR FOR DRIVING AN ANALOG ELECTRONIC WATCH

[75] Inventors: Osamu Miyazawa; Akihiko Maruyama; Joji Kitahara, all of Suwa, Japan

[73] Assignee: Seiko Epson Corporation, Tokyo, Japan

[*] Notice: The portion of the term of this patent subsequent to Sep. 21, 2010, has been disclaimed.

[21] Appl. No.: 602,457

[22] Filed: Oct. 22, 1990

[30] Foreign Application Priority Data

| Oct. 20, 1989 | [JP] | Japan | 1-273082 |
| Nov. 1, 1989 | [JP] | Japan | 1-128181 U |
| Jul. 5, 1990 | [JP] | Japan | 2-71804 U |
| Jul. 6, 1990 | [JP] | Japan | 2-178712 |
| Jul. 26, 1990 | [JP] | Japan | 2-79682 U |

[51] Int. Cl.⁶ .................................................. G04F 5/00
[52] U.S. Cl. ........................ 368/157; 368/160; 368/204
[58] Field of Search ............................. 368/204, 157, 368/160; 310/323, 364, 316, 317

[56] References Cited

U.S. PATENT DOCUMENTS

| 4,513,219 | 4/1985 | Katsuma et al. . |
| 4,692,672 | 9/1987 | Okuno . |
| 4,727,276 | 2/1988 | Izukawa et al. . |
| 4,739,212 | 4/1988 | Imasaka et al. ........................ 310/323 |
| 4,763,148 | 8/1988 | Tsukimoto et al. . |
| 4,771,203 | 9/1988 | Mukohjima et al. . |
| 4,794,294 | 12/1988 | Shimizu . |
| 4,829,209 | 5/1989 | Kawasaki et al. . |
| 4,882,500 | 11/1989 | Iijima . |
| 4,914,336 | 4/1990 | Yamasaki . |
| 4,937,488 | 6/1990 | Fujie et al. . |
| 4,952,834 | 8/1990 | Okada . |
| 4,954,742 | 9/1990 | Izukawa . |
| 4,980,599 | 12/1990 | Kuwabara et al. . |
| 5,001,404 | 3/1991 | Kataoka . |
| 5,006,746 | 12/1991 | Kasuga et al. . |
| 5,010,222 | 6/1991 | Suganuma . |
| 5,013,956 | 3/1991 | Kurozumi et al. . |
| 5,023,526 | 10/1992 | Kuwabara et al. . |
| 5,087,852 | 3/1992 | Culp . |
| 5,247,220 | 9/1993 | Miyazawa et al. ........................ 368/323 |

FOREIGN PATENT DOCUMENTS

| 58-93477 | 6/1983 | Japan . |
| 59-122385 | 7/1984 | Japan . |
| 59-37673 | 9/1984 | Japan . |
| 60-51478 | 3/1985 | Japan . |
| 245482 | 5/1985 | Japan . |
| 139280 | 6/1986 | Japan . |
| 224883 | 10/1986 | Japan . |
| 148077 | 6/1987 | Japan . |
| 247770 | 10/1987 | Japan . |
| 62-293980 | 12/1987 | Japan . |
| 64582 | 3/1988 | Japan . |
| 190569 | 8/1988 | Japan . |
| 283475 | 11/1988 | Japan . |
| 305772 | 12/1988 | Japan . |
| 1107678 | 4/1989 | Japan . |
| 107678 | 4/1989 | Japan . |

OTHER PUBLICATIONS

Iijima, "Ultrasonic Motor Using Flexural Standing Wave", *Japanese Journal of Applied Physics Supplement*, 23–1 (1987).

Ijima, "Ultrasonic Motor Using Flexural Standing Wave", *Japanese Journal of Applied Physics*, Supplements, vol. 26, No. 26–1, 1987.

*Primary Examiner*—Bernard Roskoski
*Attorney, Agent, or Firm*—Stroock & Stroock & Lavan

[57] ABSTRACT

An electronic timepiece utilizing a motor to drive indicating hands is provided. The motor includes a first member having displaceable portions displaceable in a first direction. A second member moveable in a second direction is moved in the second direction by selectively coming in contact with the first member.

34 Claims, 24 Drawing Sheets

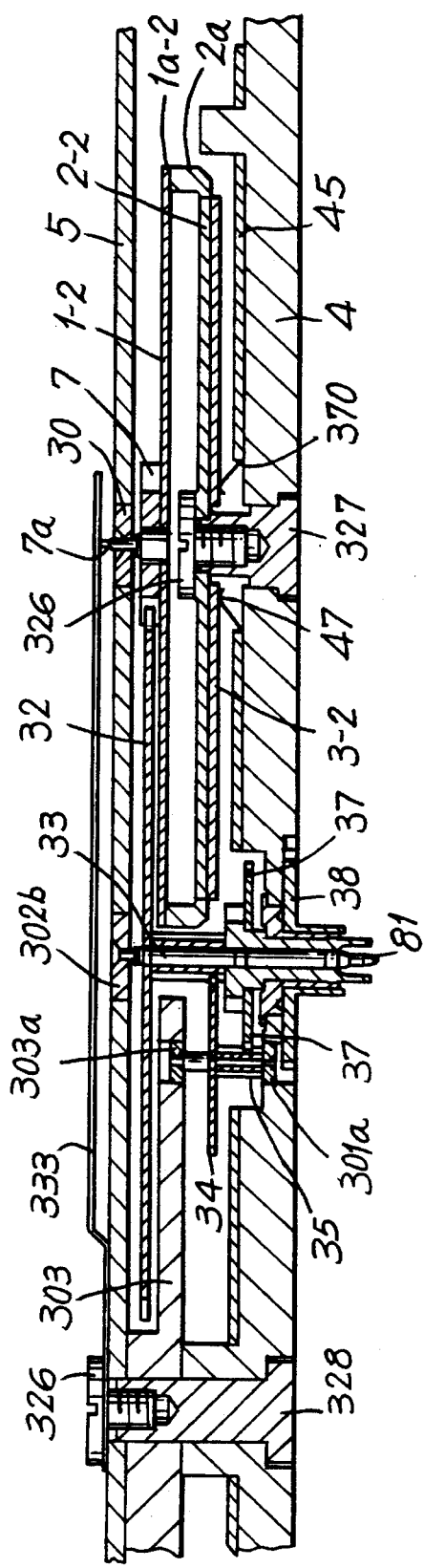
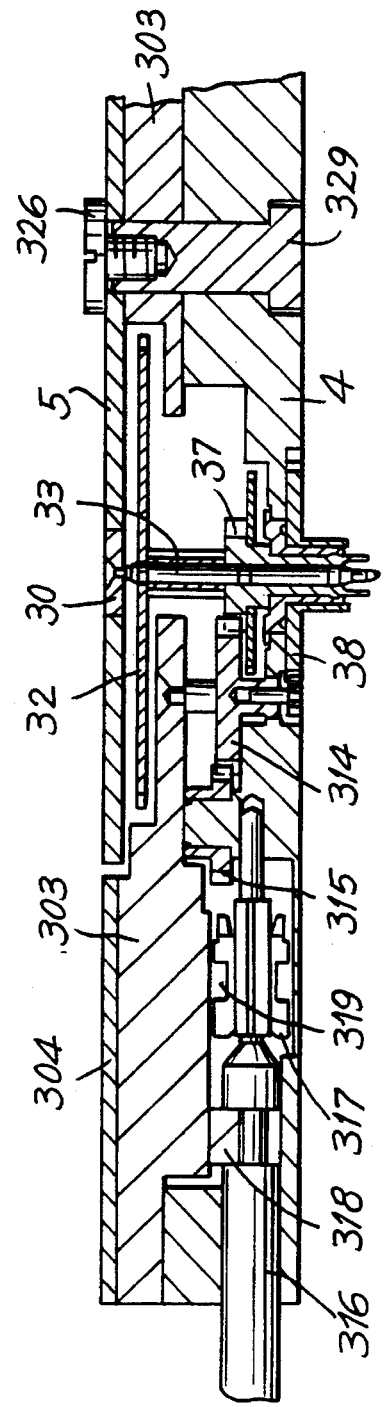
FIG.33
FIG.34

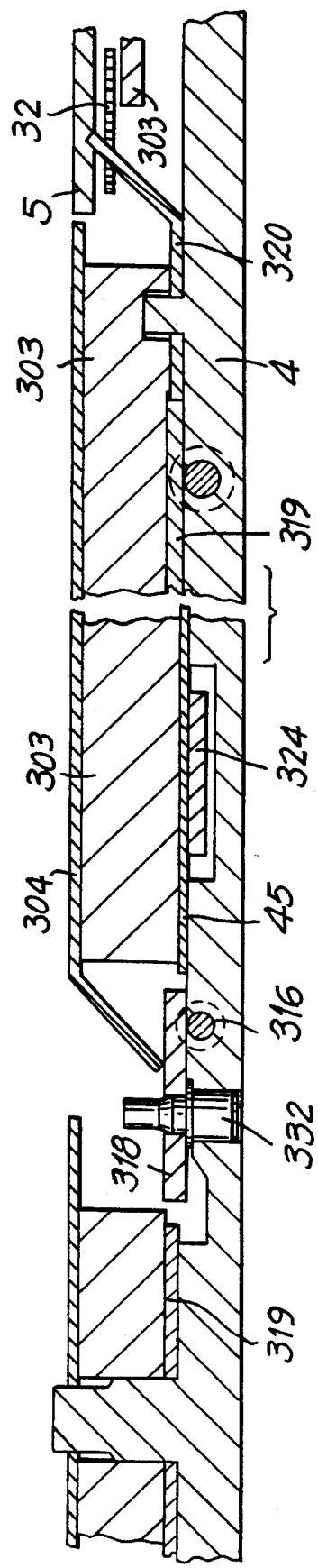
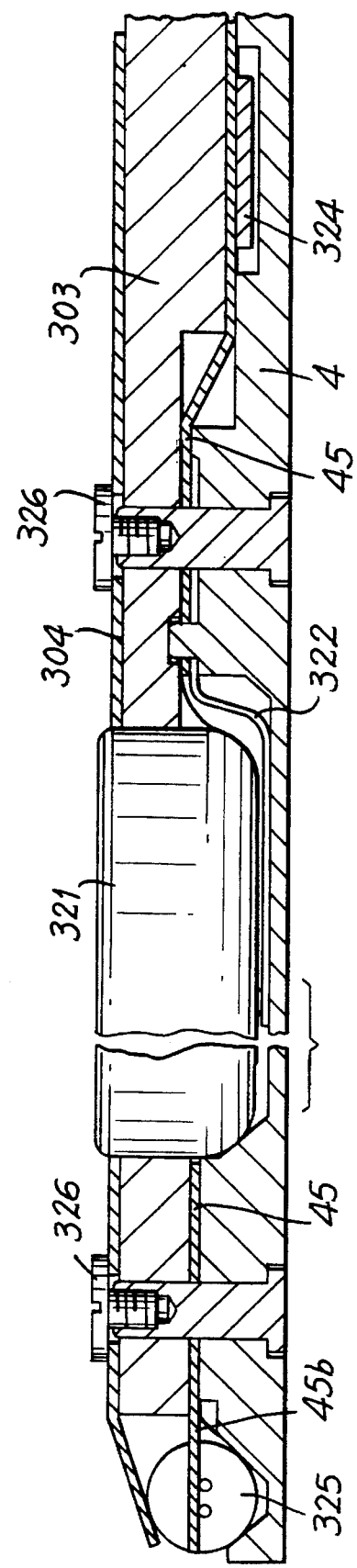
FIG. 35
FIG. 36

ULTRASONIC MOTOR FOR DRIVING AN ANALOG ELECTRONIC WATCH

BACKGROUND OF THE INVENTION

The present invention relates to an electronic watch, and in particular, to an electronic analog watch driven by an ultrasonic motor.

It is known in the art to utilize ultrasonic motors to drive an electronic analog watch. Conventional electronic watches of this type use an ultrasonic motor to convert vibrational energy to rotational energy necessary to move the indicating hands by applying a traveling wave to vibrators to drive a rotor. With this type of ultrasonic motor, however, the amount of its movement inevitably involves an error. For example, where the motor is caused to rotate at the rate of 6° per second, the rotation involves an error of several percent and the error is accumulated, thereby deteriorating the accuracy of the watch over time. To correct this error a rotary encoder is mounted within the watch to cancel the errors. However, in light of the requirement for miniaturization in electronic watches, the mounting of such an encoder has been difficult; increasing watch size and complexity rather than decreasing it.

Accordingly, it is desired to provide an electronic analog watch which overcomes the shortcomings of the prior art.

SUMMARY OF THE INVENTION

Generally speaking, in accordance with the invention, an electronic watch utilizes an ultrasonic step motor. The ultrasonic step motor includes a plurality of vibrators and a stator adapted to be excited by the plurality of vibrators. A rotor having a plurality of projections comes in contact with the stator. A drive control circuit applies a standing wave to each of the vibrators so that phase shifting of the standing wave is switched among the vibrators causing the rotor to be driven in a stepwise manner.

In one embodiment, a pinion is mounted on the rotor, the pinion meshing with timing wheels to drive the hands of the electronic analog watch. The watch may include a circuit board having a plurality of circuit patterns formed thereon. A portion of the circuit comes in contact with the vibrators to control the operation of the vibrators. This portion of the circuit overhangs the circuit board and is biased against the vibrators.

Accordingly, it is an object of this invention to provide an electronic watch which utilizes an ultrasonic step motor to convert vibrational energy to mechanical energy.

Another object of the present invention is to provide an electronic watch designed to ensure stable rotational movement of the hands by reducing the speed of a rotor which is radially guided only at one place.

A further object of the present invention is to provide an electronic watch having an electric conducting structure which ensures an excellent working performance in assemblage, prevents any deterioration in the characteristics of the vibrators and produces no effect on the modes of vibration over time.

Still another object of the present invention is to provide an electronic watch which includes an ultrasonic step motor capable of accurately moving a moving body to any desired position.

Yet another object of the present invention is to provide an electronic watch having a thin watch movement which is designed so that the speed of the rotor is reduced to allow time indication by hands while ensuring a greater torque, greater accuracy, reduced power consumption and reduced voltage.

A further object of the present invention is to provide an electronic watch so designed that a battery is mounted on the upper part of a movement so as to realize a reduction in the size of the movement by utilizing benefits derived from an ultrasonic motor having a reduced number of components parts.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

3

Figure 17:
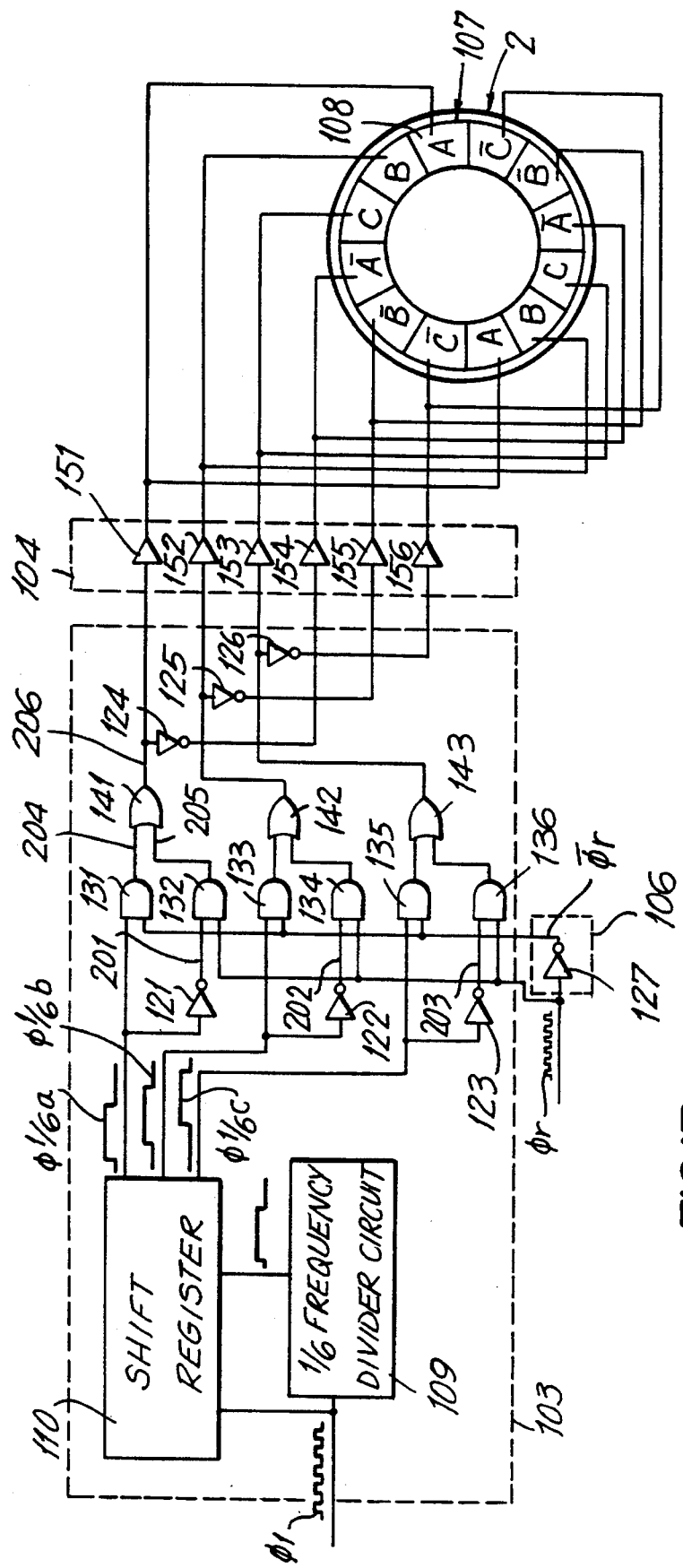
FIG. 17 is a circuit diagram of a drive control apparatus for an ultrasonic step motor constructed in accordance with the present invention.
Figure 18:
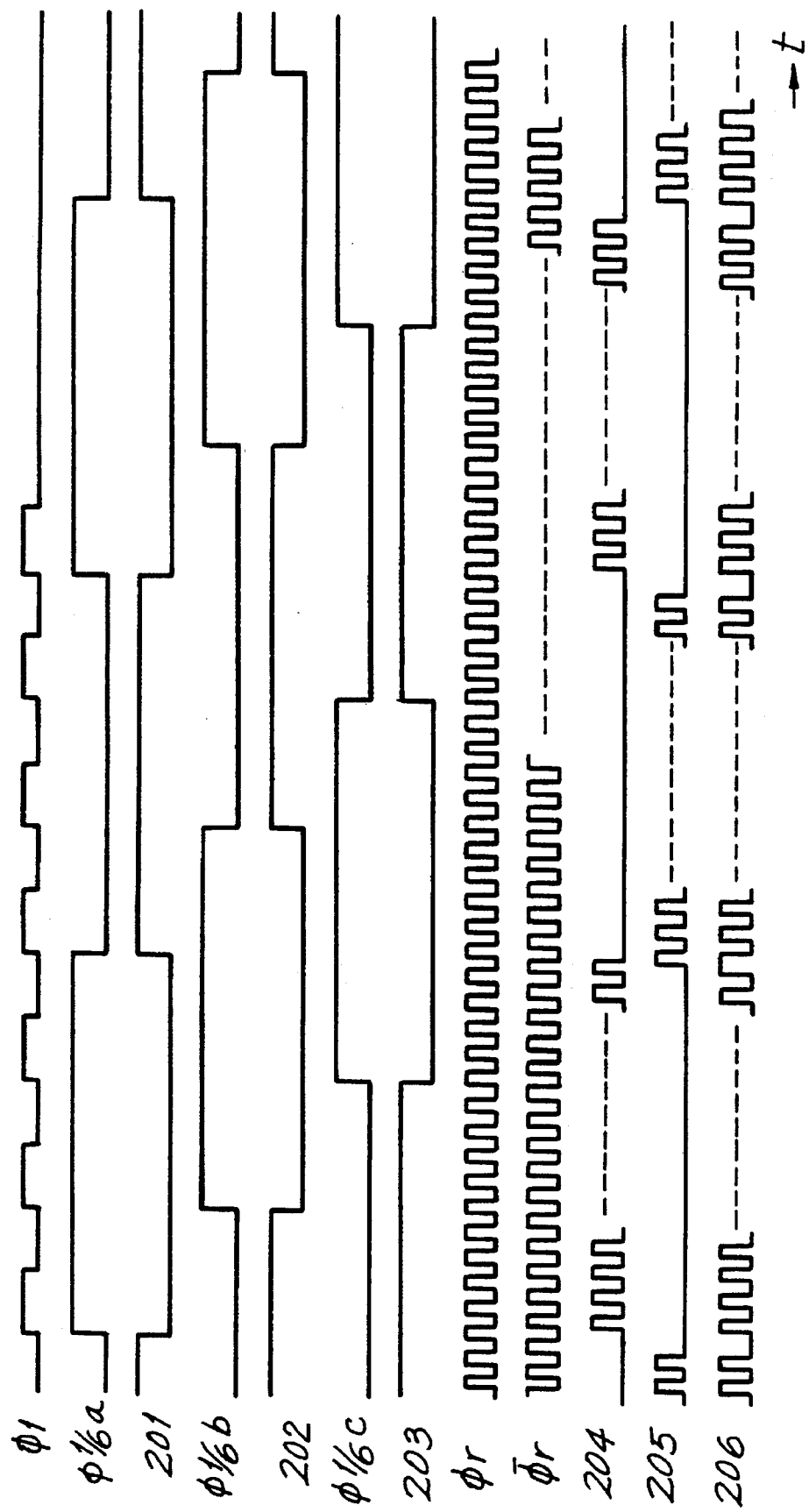
Figure 19:
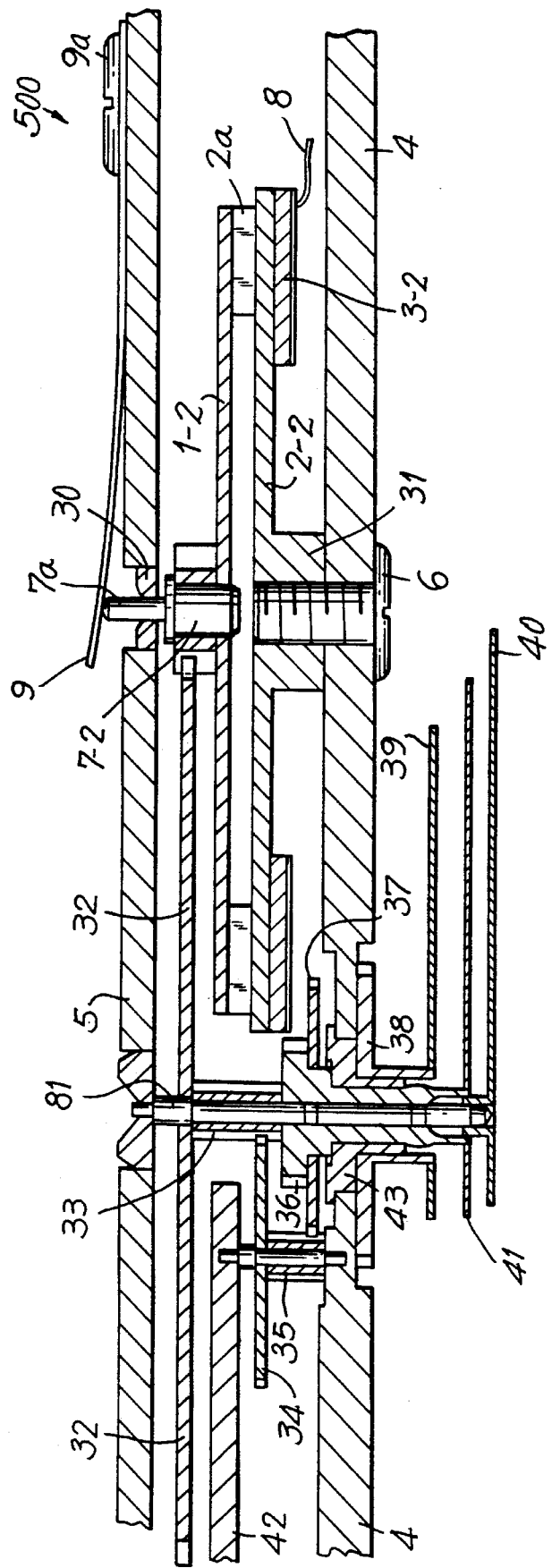
Figure 20:
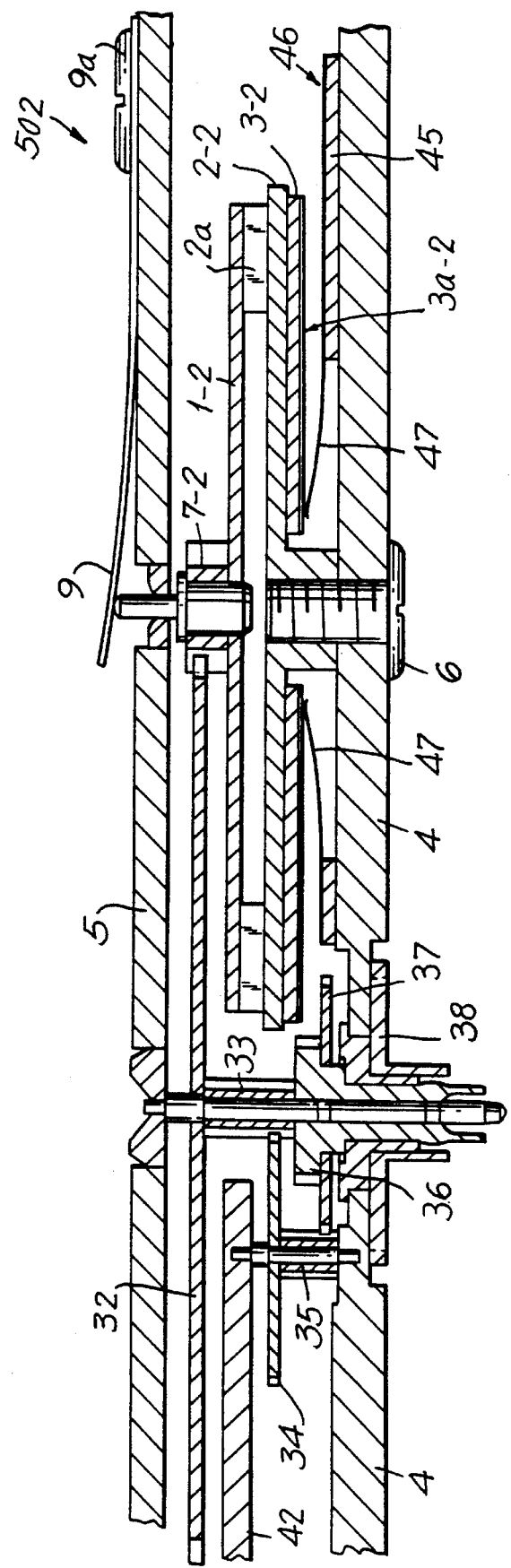
Figure 21:
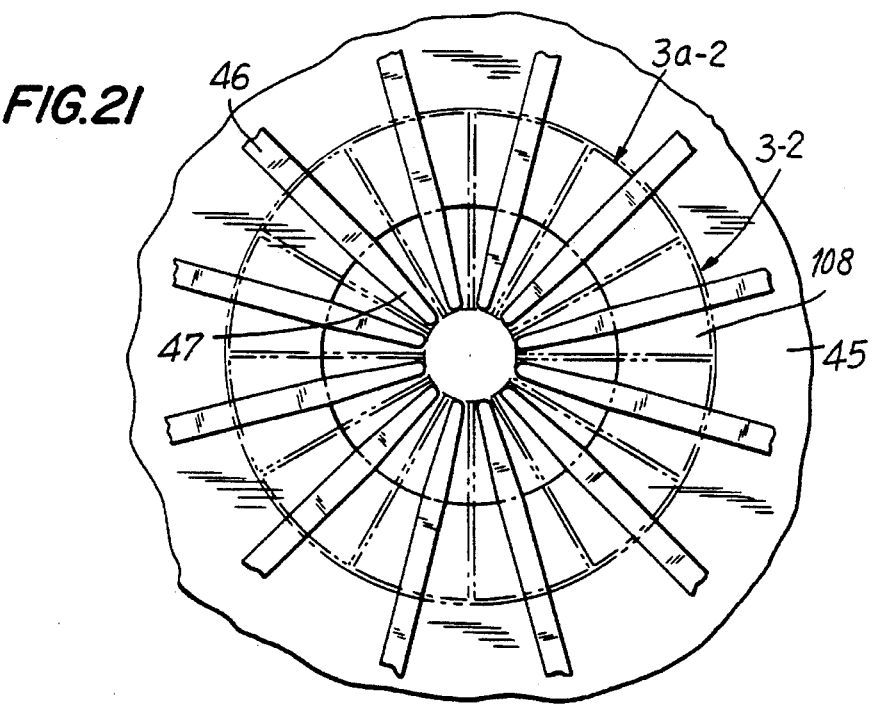
Figure 22:
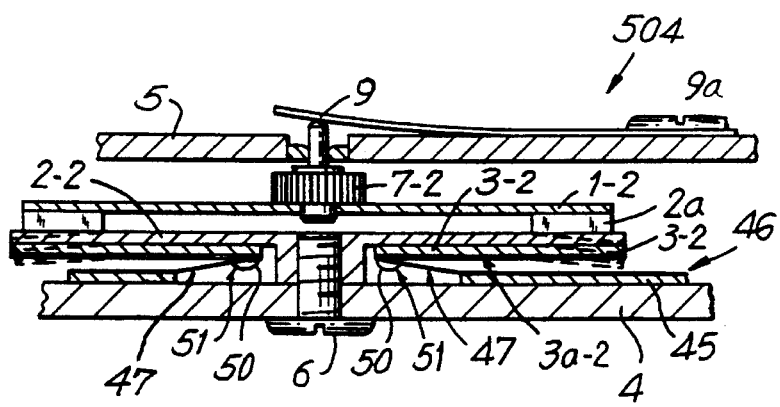
Figure 23:
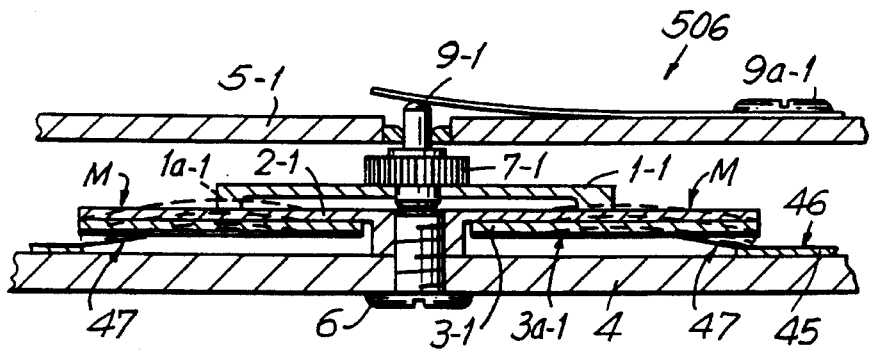
Figure 24:
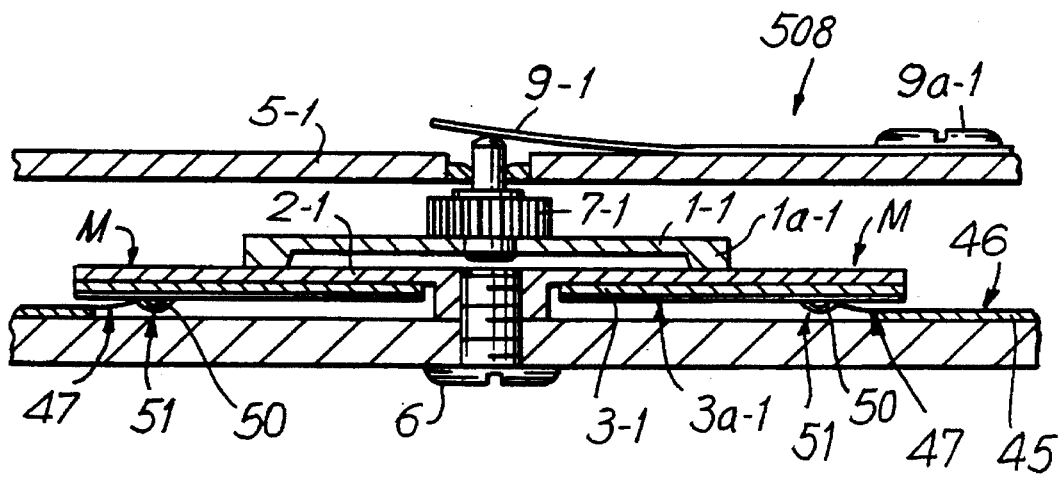
Figure 25:
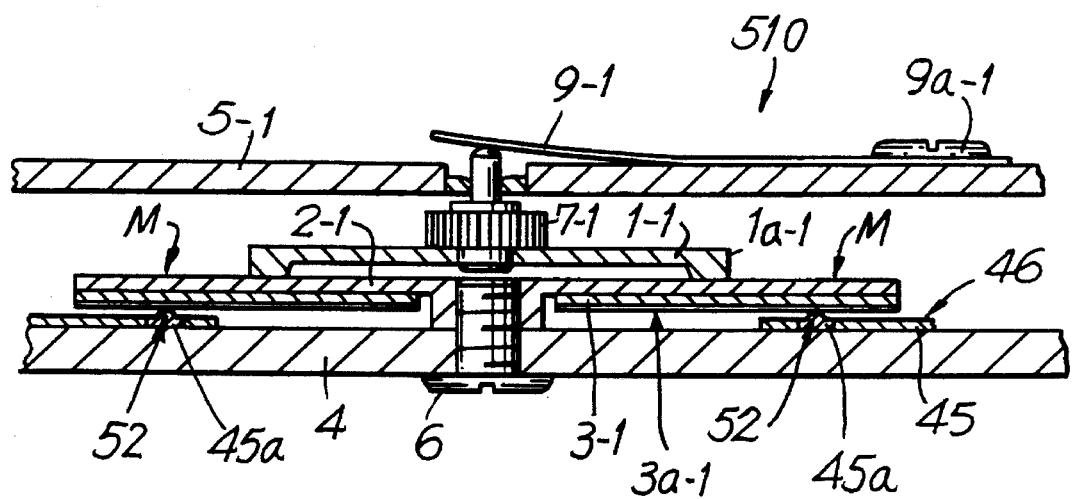
Figure 26:
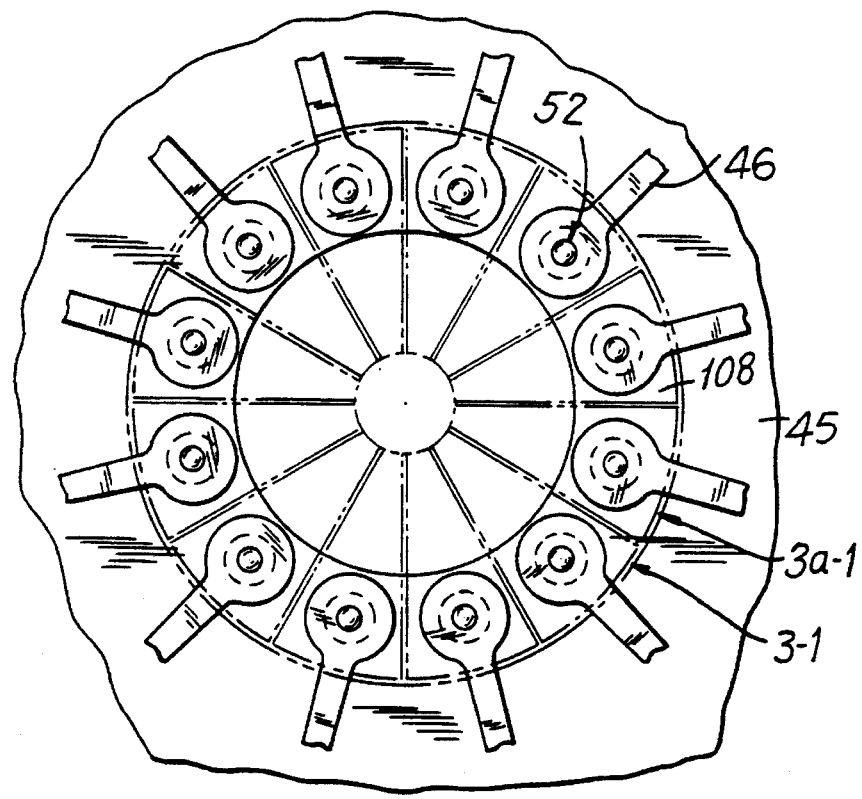
Figure 27:
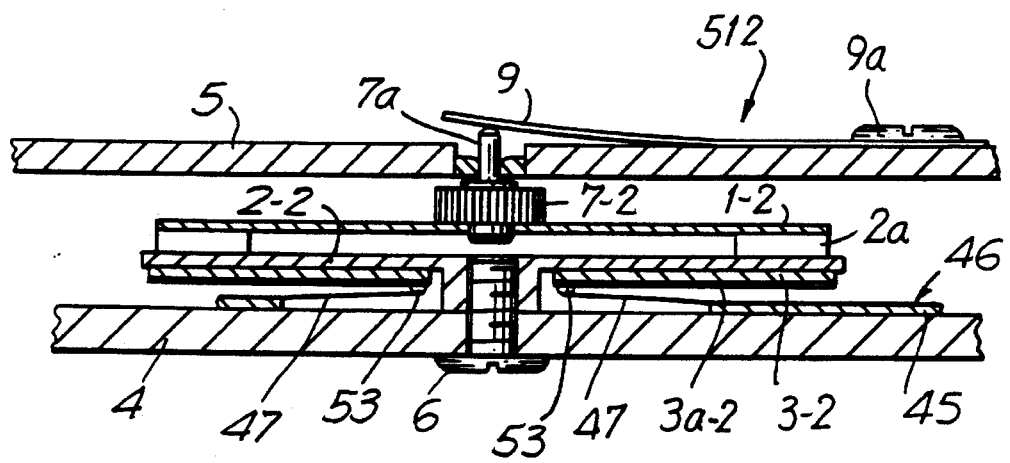
Figure 28:
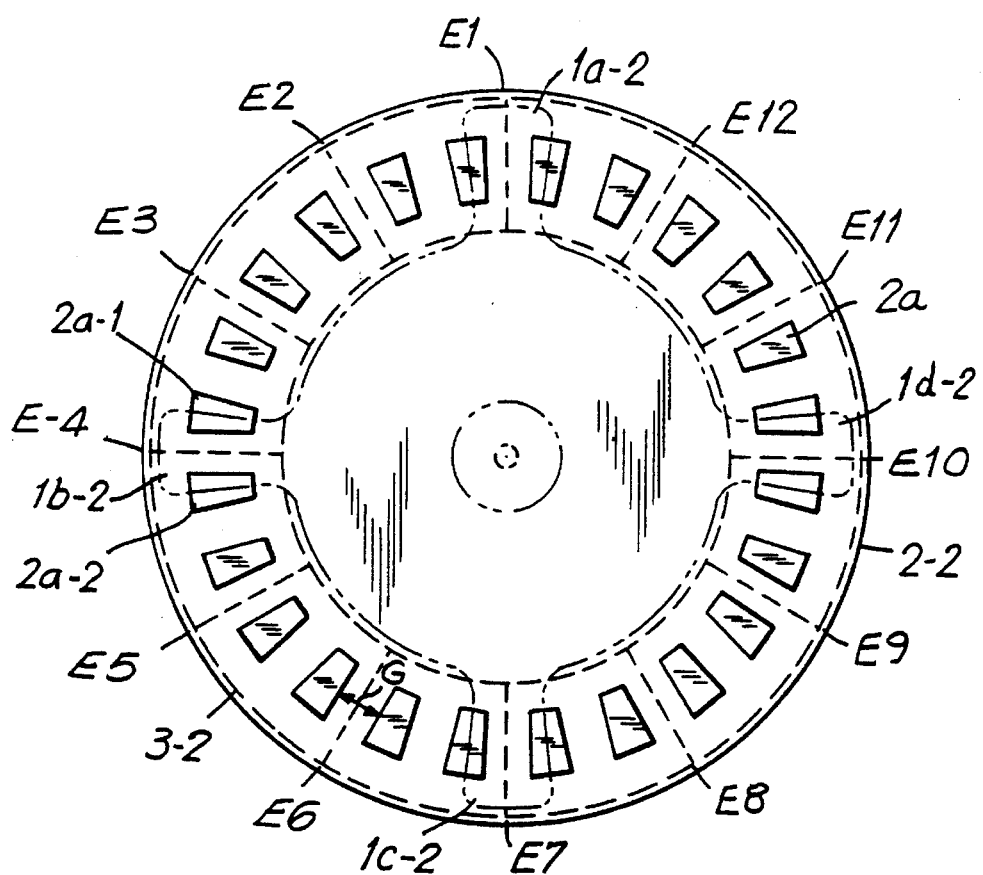
Figure 29:
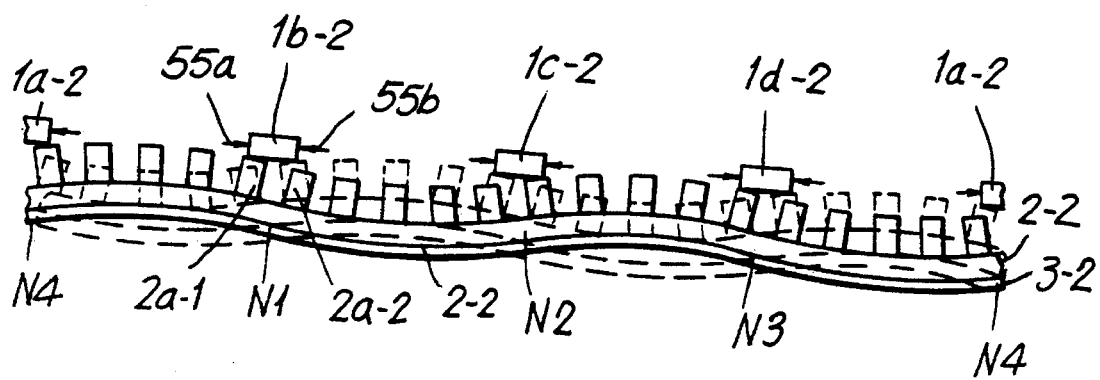
Figure 30:
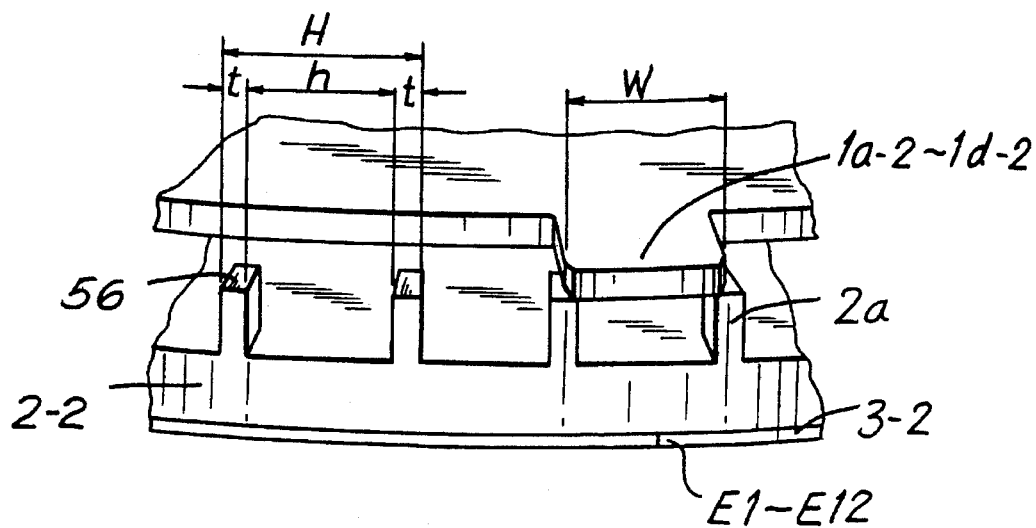
Figure 31:
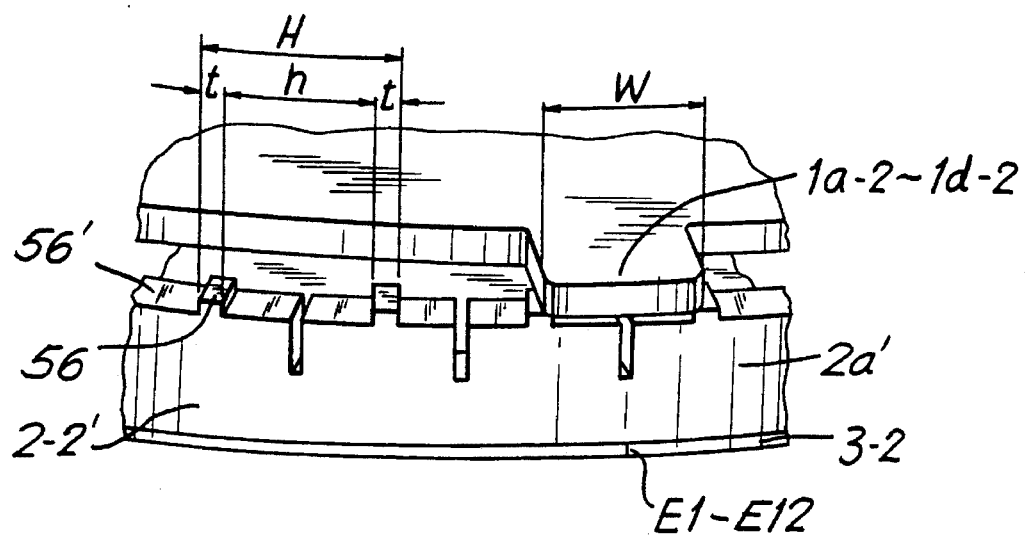
Figure 32:
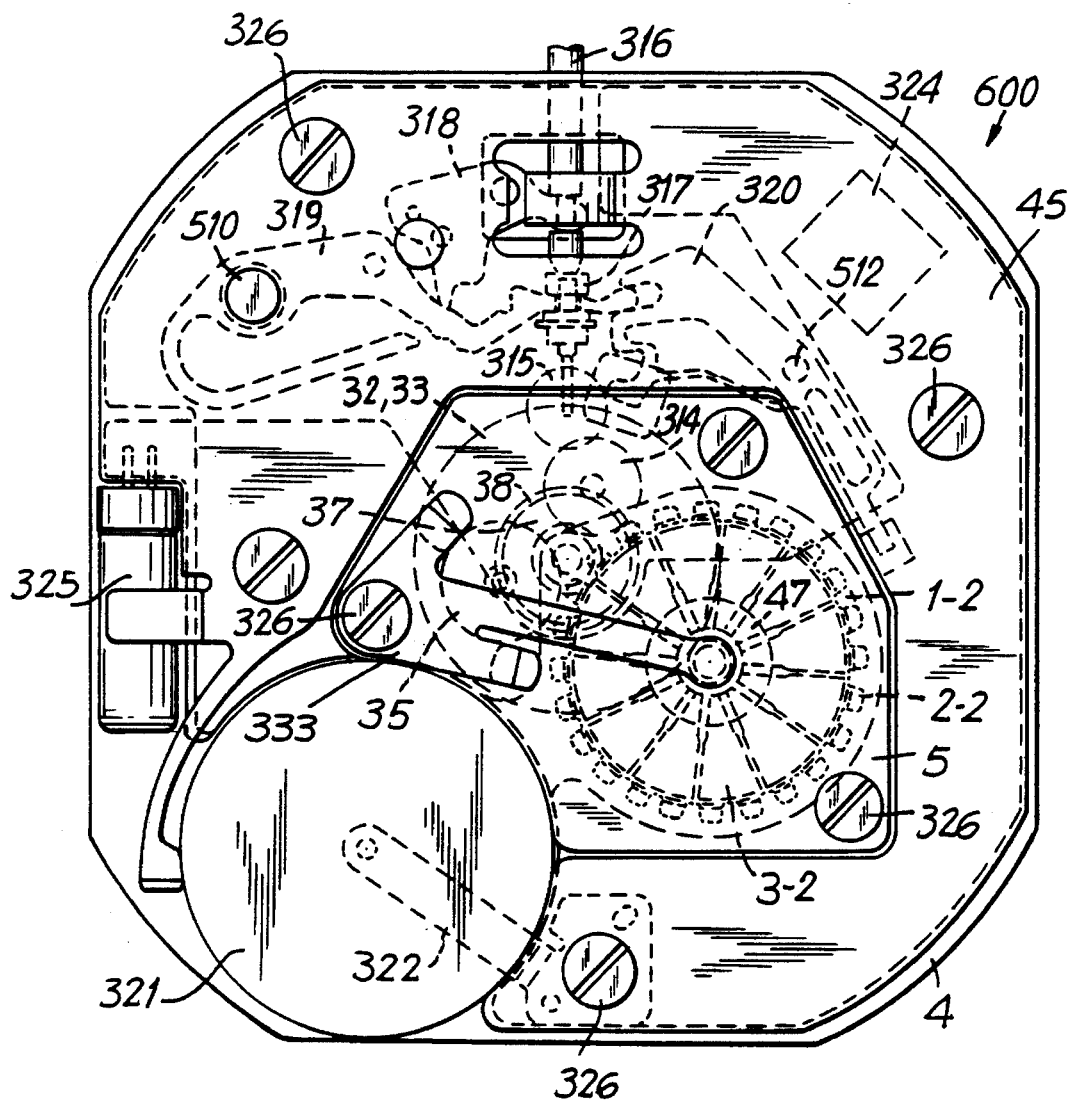
Figure 37:
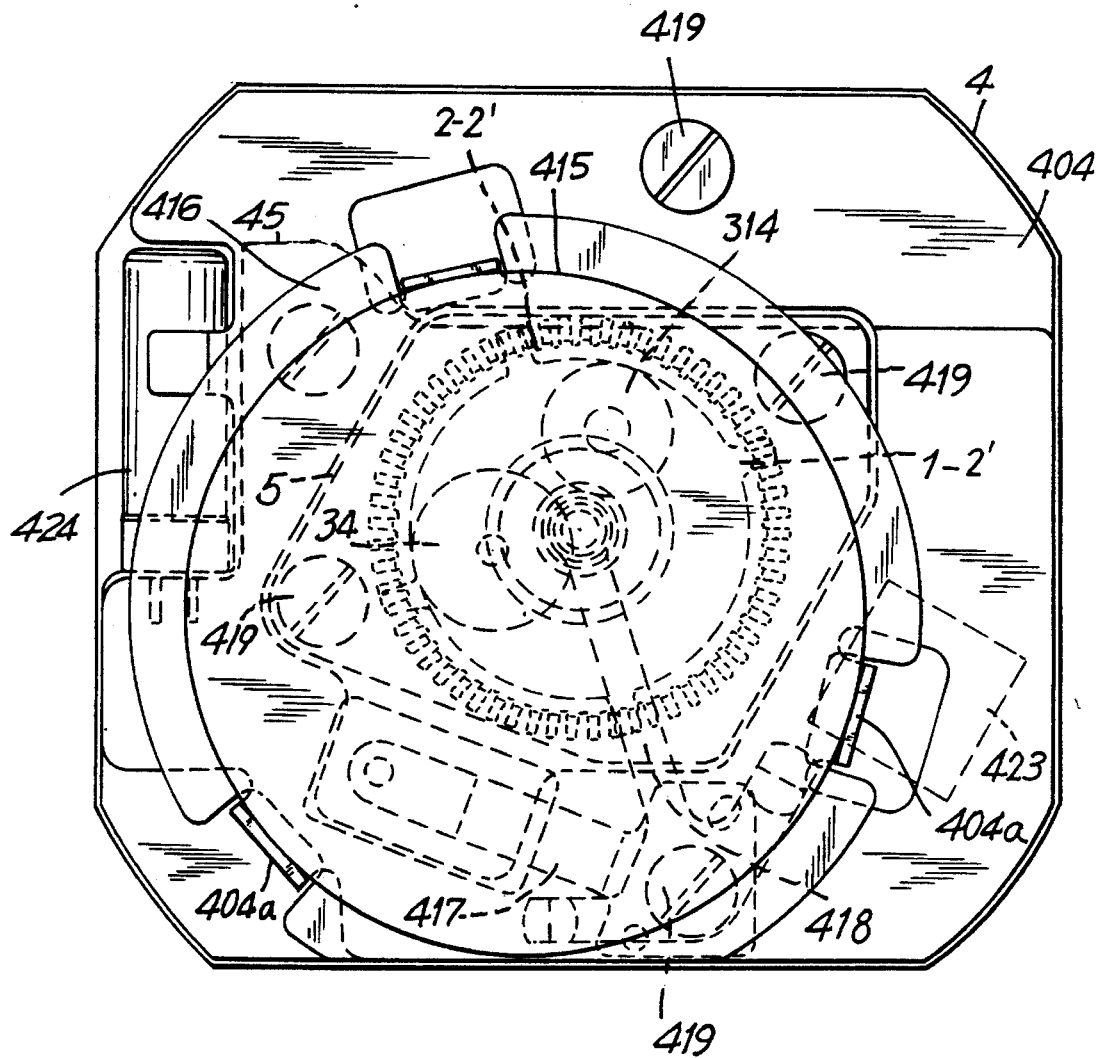
Figure 38:
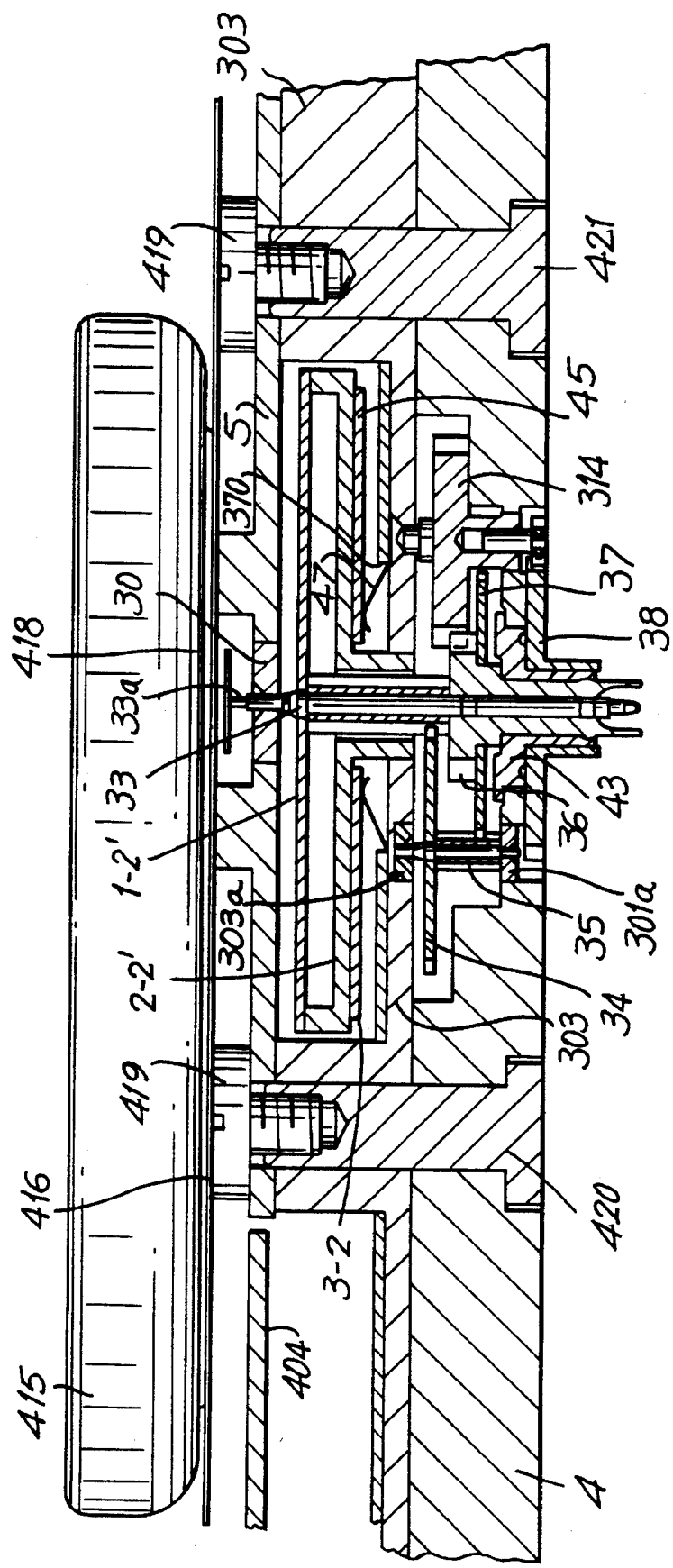
Figure 39:
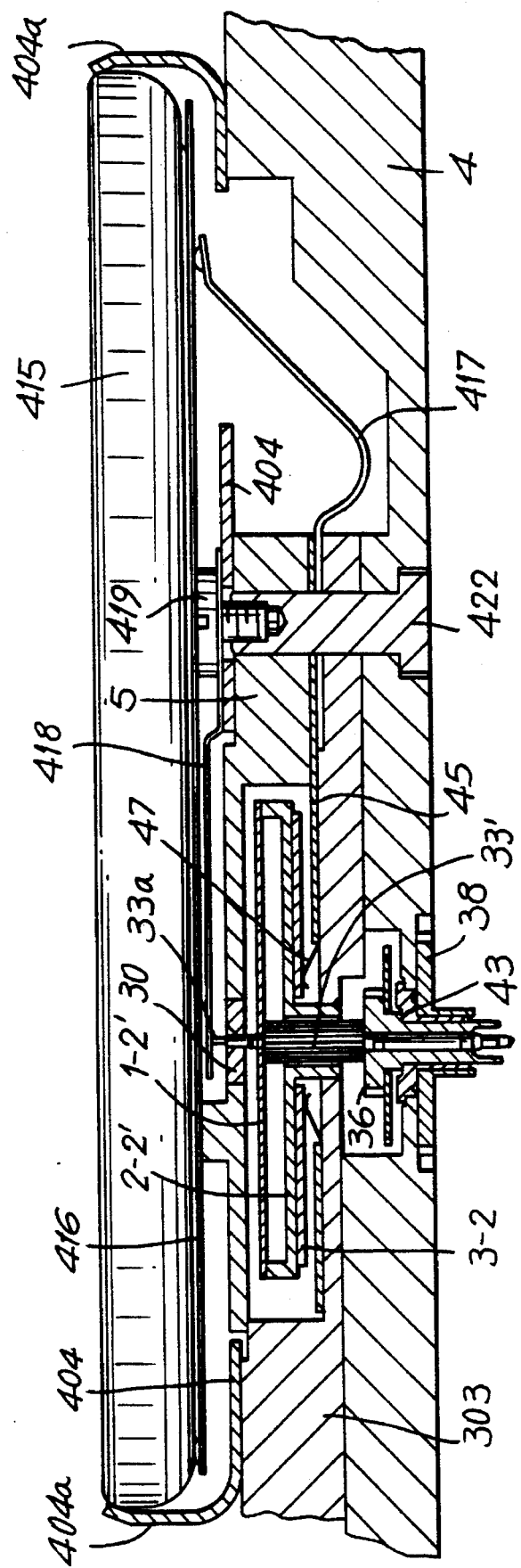

FIG. 18 is a timing chart showing the operation of the circuit of FIG. 17;

FIG. 19 is a sectional view of an electronic watch constructed in accordance with the invention having an ultrasonic step motor;

FIG. 20 is a sectional view of an electronic watch constructed in accordance with another embodiment of the invention illustrating the electric conducting structure of the ultrasonic step motor;

FIG. 21 is a bottom plan view of the circuit patterns, the overhang portions and the vibrators of FIG. 20;

FIG. 22 is a sectional view of an electronic watch constructed in accordance with another embodiment of the invention illustrating electric conducting structure of the ultrasonic step motor;

FIG. 23 is a sectional view of an electronic watch constructed in accordance with another embodiment of the invention illustrating electric conducting structure of the ultrasonic step motor;

FIG. 24 is a sectional view of an electronic watch constructed in accordance with another embodiment of the invention illustrating electric conducting structure of the ultrasonic step motor;

FIG. 25 is a sectional view of an electronic watch constructed in accordance with another embodiment of the invention illustrating electric conducting structure of the ultrasonic step motor;

FIG. 26 is a bottom plan view of the circuit patterns, the overhang portions and the vibrators of FIG. 25;

FIG. 27 is a sectional view of an electronic watch constructed in accordance with another embodiment of the invention illustrating electric conducting structure of the ultrasonic step motor;

FIG. 28 is a top plan view of a stator for the ultrasonic step motor constructed in accordance with the invention showing the rotor in phantom;

FIG. 29 is a schematic diagram showing the operation of the ultrasonic step motor of FIG. 28;

FIG. 30 is a perspective view of the stator projections of the ultrasonic step motor constructed in accordance with the invention;

FIG. 31 is a perspective view of the stator projections of the ultrasonic step motor constructed in accordance with another embodiment of the invention;

FIG. 32 is a top plan view of an electronic watch constructed in accordance with another embodiment of the present invention;

FIG. 33 is a sectional view showing the ultrasonic motor and the wheel train of the electronic watch of FIG. 32;

FIG. 34 is a sectional view showing the wheel train and the time correcting stem of the electronic watch of FIG. 32;

FIG. 35 is a sectional view showing the time correcting stem of the electronic watch of FIG. 32;

FIG. 36 is a sectional view showing the battery and the circuitry of the electronic watch of FIG. 32;

FIG. 37 is a sectional view of an electronic watch constructed in accordance with another embodiment of the present invention;

FIG. 38 is a sectional view showing the ultrasonic motor and the wheel train of the electronic watch of FIG. 37; and FIG. 39 is a sectional view of the battery and the circuitry of the electronic watch of FIG. 37.

4

DETAILED DESCRIPTION OF THE PREFERRED EMBODIMENTS

Figure 1:
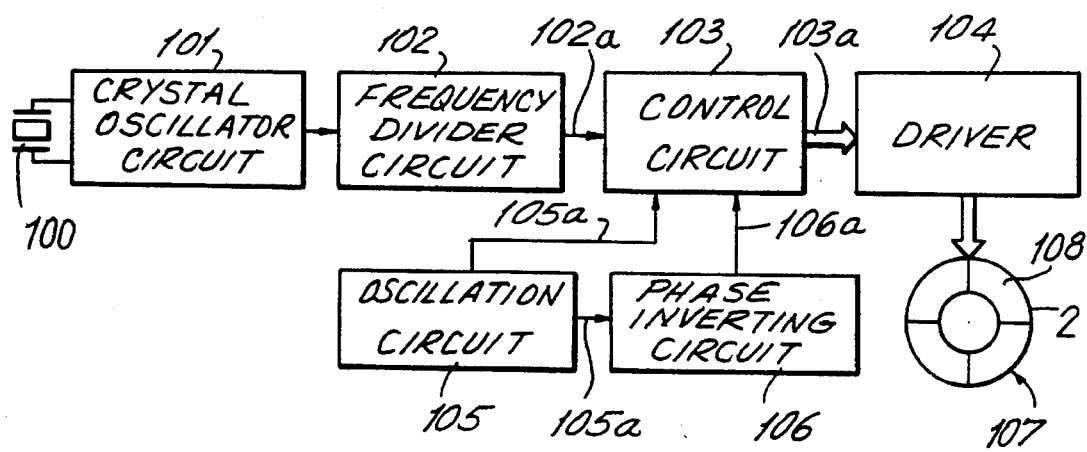
FIG. 1 is a block diagram of a driving circuit for an ultrasonic step motor constructed in accordance with the present invention.

Reference is first made to FIG. 1 in which a block diagram of an ultrasonic step motor for use in an electronic watch and a drive system for driving the motor are provided. A crystal plate 100 drives a crystal oscillator circuit 101 producing a signal. A frequency divider circuit 102 divides the frequency of the signal output by crystal oscillator circuit 101 and outputs a divided frequency signal 102a. A control circuit 103 receives and processes an oscillation signal 105a of an oscillation circuit 105 which oscillates at the same frequency as the resonant frequency of a vibrating unit 107, a signal 106a from a phase inverting circuit 106 for inverting the phase of oscillation signal 105a of the oscillation circuit 105, and divided signal 102a and outputs drive control signals 103a. Phase inverting circuit 106 receives oscillation circuit 105a and inverts signal 105a to produce signal 106a. A driver 104 amplifies the drive control signals 103a from control circuit 103 to apply drive voltages to the vibrating unit 107. Vibrating unit 107 includes vibrators 108 (four vibrators are shown here by way of example) constructed so as to be vibrated independently of one another.

Output signal 102a of the frequency divider circuit 102 acts as a control signal for controlling the output of oscillation signal 105a and the oppositely phased signal 106a. The output signals 103a of control circuit 103 act as drive control signals for driving vibrating unit 107.

Figure 7:
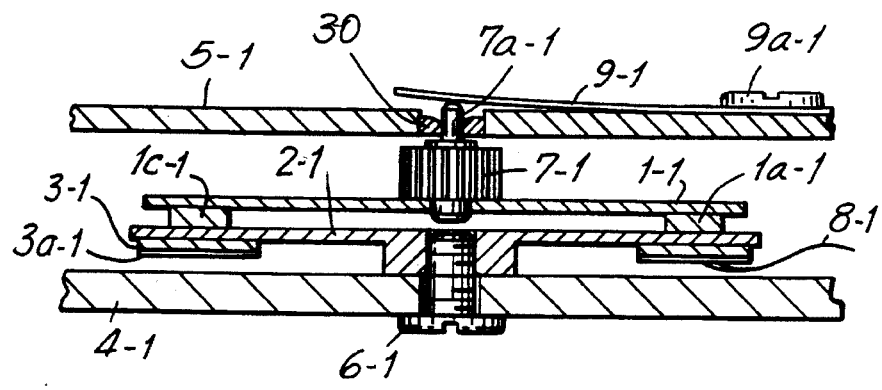
FIG. 7 is a sectional view showing an ultrasonic step motor constructed in accordance with one embodiment of the invention.
Figure 8:
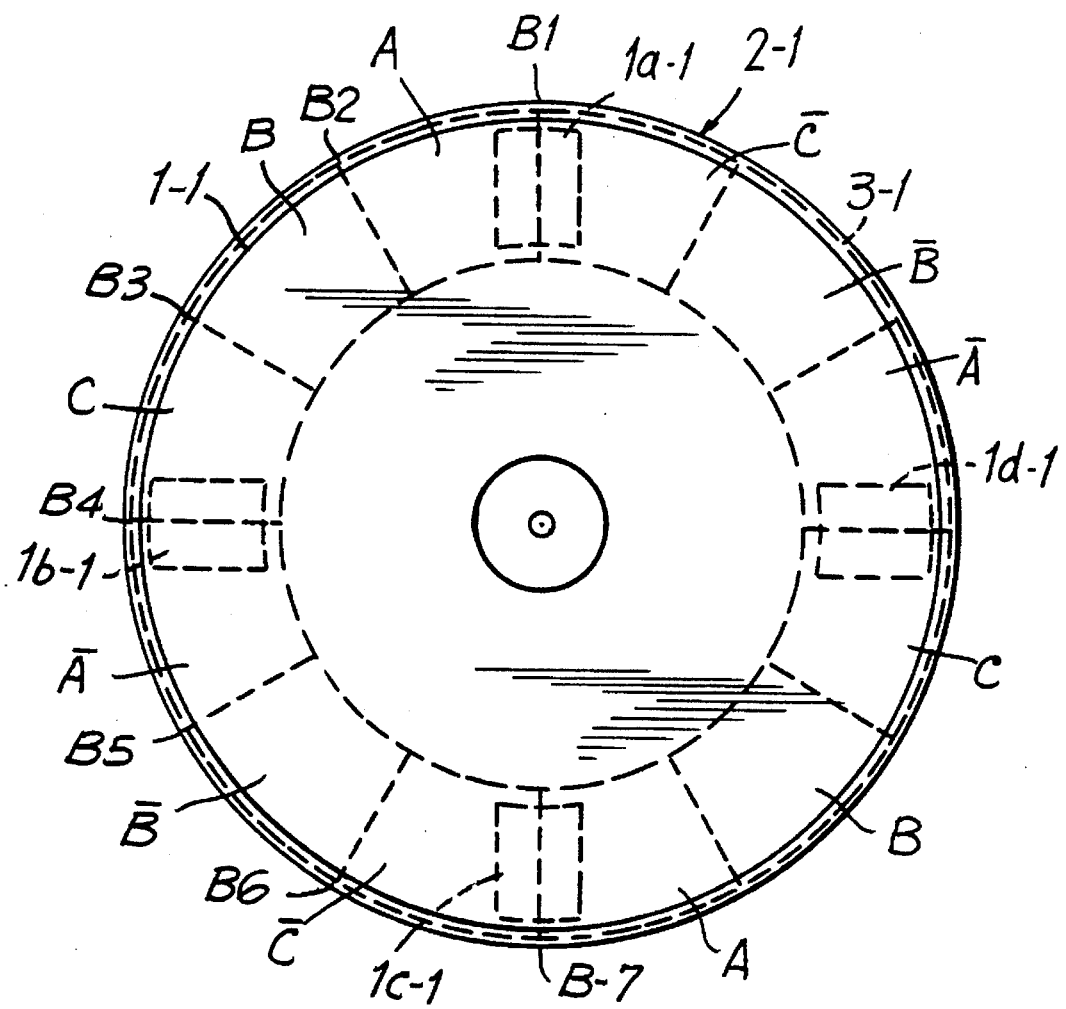
FIG. 8 is a top plan view of the stator-rotor section of the ultrasonic step motor of FIG. 7.

Reference is now made to FIGS. 7 and 8 wherein an ultrasonic step motor constructed in accordance with one embodiment of the invention is provided to explain the principles of the invention. The ultrasonic step motor of FIG. 7 is a rotary type motor. A ground plate 4 supports a stator 2-1. Stator 2-1 is affixed to ground plate 4 with a screw 6. A rotor 1-1 having projections 1a-1, 1b-1, 1c-1 and 1d-1 positioned radially thereabout is disposed on stator 2-1. A pinion 7-1 is press fit within stator 1-1 and is rotatably supported within a wheel train support 5 between jewel bearings 30 by a pivot 7a-1 of pinion 7 extending through jewel bearing 30. A spring 9-1 affixed to wheel train support 5-1 by a screw 9a-1 biases pinion 7-1 towards rotor 1-1 imparting a frictional force between projections 1a-1 through 1d-1 of rotor 1-1 and stator 2-1 as well as maintaining pinion 7-1 in place between jewel bearing 30 and rotor 1-1. A piezoelectric unit 3-1 is mounted on stator 2-1 so that stator 2-1 is disposed between rotor 1-1 and piezoelectric unit 3-1. An electrode pattern 3a-1 is formed on piezoelectric unit 3-1 and is coupled to a voltage source such as a battery through lead wires 8-1.

Reference is now made to FIGS. 2a–e in which diagrams are provided for illustrating the operating principle of the ultrasonic step motor in accordance with the invention. In this embodiment, a piezoelectric unit 3-1 is provided as the vibrating unit 107. Each diagram is a linear representation of the rotary ultrasonic step motor of FIGS. 7 and 8.

Figure 2A:
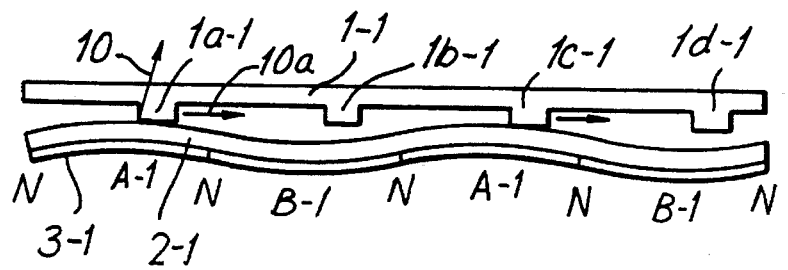
FIGS. 2a through 2e are explanatory diagrams for the operation of the ultrasonic step motor.

Reference is first made to FIG. 2a in which the condition of a fixed-phase vibration mode is shown. Rotor 1-1 is formed with projections 1a-1, 1b-1, 1c-1 and 1d-1. Piezoelectric unit 3-1 is attached to stator 2-1 so that stator 2-1 is disposed between rotor 1-1 and piezoelectric unit 3-1. Projections 1a-1 and 1c-1 partially contact with stator 2-1 at a contact surface of projections 1a-1 and 1c-1. Projections 1a-1 and 1c-1 have a width which is less than the width between adjacent projections (FIGS. 2a–5), stator 2-1 only contacting the projections and not contacting rotor 1-1 at the width between projections. Piezoelectric unit 3-1 includes four vibrators which are classified into two groups of A and B. Vibrators A and B are displaced in opposite phase to each other. N designates the nodes for the vibration mode of stator 2-1. In this state, projections 1a-1 partially contact stator 2-1.

Figure 2B:
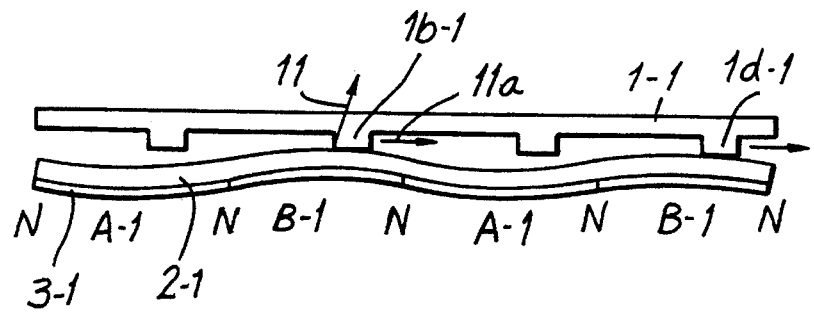

Reference is next made to FIG. 2b in which the condition of the vibration mode of opposite phase to that shown in FIG. 2a is provided. In this condition, the projections 1b-1 and 1d-1 partially contact stator 2-1.

In FIGS. 2a and 2b, projections 1a-1, 1b-1, 1c-1 and 1d-1 of rotor 1-1 which are positioned at the same interval or multiple interval of the nodes of the stator 2-1. Projections 1a-1 through 1d-1 are separated from each other by a distance equal to the distance between adjacent nodes or distances which are a multiple thereof to come in contact with stator 2-1. The portions of rotor 1-1 contacting with the stator 2-1, are subject to forces 10 and 11 respectively in the directions shown by the force arrows. Forces 10 and 11 include component forces tending toward the nodes and away from the projections in the vibration modes so that the rotor 1-1 is acted upon by forces in the direction of force components 10a and 11a, respectively, i.e. the forces tending toward the nodes positioned nearby.

Figure 2C:
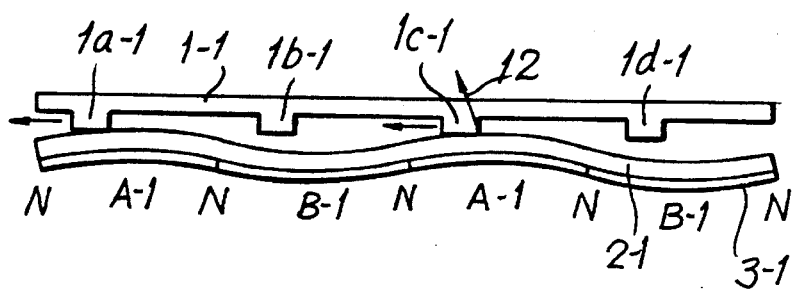
Figure 2D:
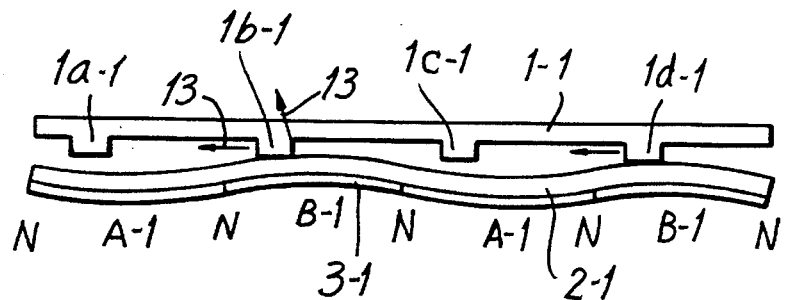

Reference is now made to FIGS. 2c and 2d in which the positional relation of stator 2-1 and the rotor 1-1 is different from FIGS. 2a and 2b, respectively. Rotor 1-1 is subject to forces 12a and 13a having an opposite direction to forces 10a and 11a respectively biasing rotor 1-1 toward the nearest nodes N due to forces 12 and 13, respectively.

Figure 2E:
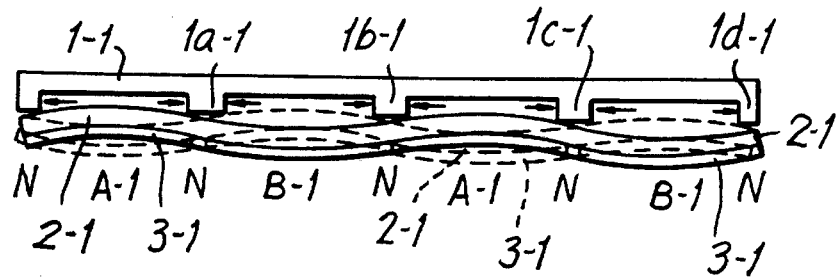

Reference is now made to FIG. 2e in which FIGS. 2a through 2d are superimposed one upon another. It will be seen that in any of these conditions the projections 1a-1 to 1d-1 of rotor 1-1 are shifted in the direction of the nodes N of stator 2-1 and they are positioned at the nodes. As a result, if the positions of the nodes N are moved stepwise, the rotor 1-1 is moved in a stepwise manner thereby operating as a stepping motor as will be described in greater detail below.

Figure 3A:
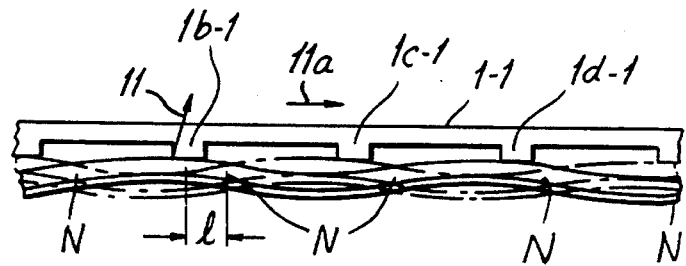
FIG. 3a is a schematic diagram showing the condition in which the positions of the nodes are shifted in accordance with the invention.

Reference is now made to FIG. 3a, a diagram showing the positions of the nodes N of the stator 2-1 in FIG. 2e as they are each shifted, the amount of shift l of each node N being less than $\lambda/4$ where $\lambda$ defines the length of one wavelength in a vibrating condition. One $\lambda$ is defined as the motion exhibited by a single adjacent vibrator pair A, B. As can be seen projections 1a-1 through 1d-1 are not positioned at the nodes N.

Figure 3B:
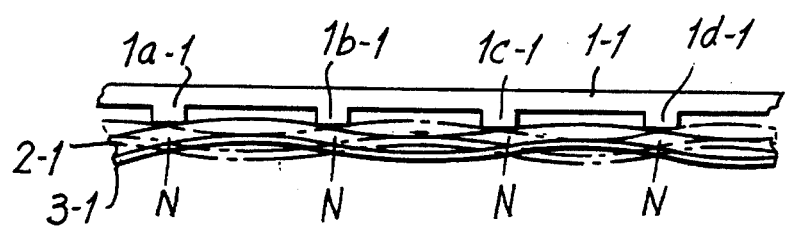
FIG. 3b is a schematic diagram showing the manner in which the rotor is shifted in accordance with the invention.

As seen in FIG. 3b, rotor 1-1 is moved from the condition of FIG. 3a. In FIG. 3a, rotor 1-1 is subjected to the force 11 (FIG. 2b) so that the rotor 1-1 is moved in the direction of the force 11a and the projections 1a-1 through 1d-1 are moved to and stopped at the positions of the respective nodes N (FIG. 3b).

Figure 4:
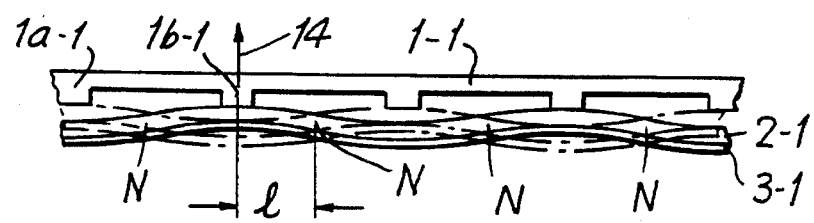
FIG. 4 is a schematic diagram showing the positions of the nodes each shifted by $\lambda/4$.

Reference is now made to FIG. 4, a diagram showing the positions of the nodes N in FIG. 2e each shifted by $l=\lambda/4$. A vertical force 14 acts on the projections 1a-1 and 1c-1 or 1b-1 and 1d-1 of rotor 1-1 so that the rotor 1-1 is not rotated. Rather, rotor 1-1 vertically vibrates in an unstable condition.

Figure 5:
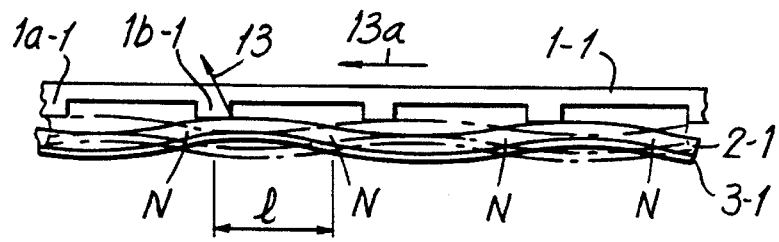
FIG. 5 is a schematic diagram showing the positions of the nodes each shifted in excess of $\lambda/4$.

Reference is now made to FIG. 5, a diagram showing the positions of the nodes N in FIG. 2e, each shifted by $l>\lambda/4$. The force 13 acting on the rotor 1-1 now acts in the direction shown and thus the rotor 1-1 is moved in the opposite direction 13a to the direction in which the nodes N are shifted.

As described in detail hereinabove, by setting the amount of shift l of the nodes N to be $l<\lambda/4$, it is possible to stably move the position of the rotor 1-1 to any desired position. It is to be noted that depending on the method of driving the stator, the amount of node shift can be set, for example to $\lambda/2<l<3\lambda/4$. In such a case, however, another node is present at the position of $\lambda/2$ and thus it is substantially equivalent to $0<l<\lambda/4$.

Reference is now made to FIGS. 6a through 6d in which diagrams showing specific methods of shifting the nodes N as discussed above are provided. In each of these Figures the vibrator 107 of FIG. 2 is divided into three parts. Piezoelectric unit 3-1 includes vibrators 21a, 21b, 21c, 22a, 22b, 22c, 23a, 23b, 23c, 24a, 24b, 24c, .... While in reality the piezoelectric unit 3-1 is formed by attaching it to the stator 2-1 as in FIG. 2, here for simplification stator 2-1 is omitted. Also, the invention is not limited to a piezoelectric unit as it is possible to use any other device provided it includes vibrators which are each capable of independently making vibrational displacements. For instance, a super-magnet device or an electromagnetic device can be used.

Figure 6A:
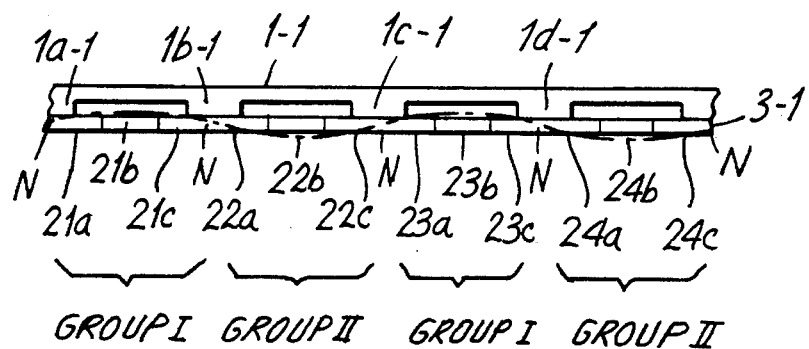
FIGS. 6a through 6d are each schematic diagrams showing specific methods for shifting the nodes in accordance with the invention.

In FIG. 6a, the vibrators 21a, 21b, 21c, 23a, 23b and 23c form a first group and the vibrators 22a, 22b, 22c, 24a, 24b and 24c form another group. Then, the two groups are driven so that they are displaced in opposite directions. Thus, in the vibration condition a node N is formed between the vibrator pair 21c and 22a, between the vibrators pair 22c and 23a, between the vibrator pair 23c and 24a and at each of the ends. As a result, each of the projections 1a-1 through 1d-1 of the rotor 1-1 is stabilized at the position corresponding to one of the nodes N. In FIG. 6a the broken lines each show the form of the vibration mode at a certain instant in time.

Figure 6B:
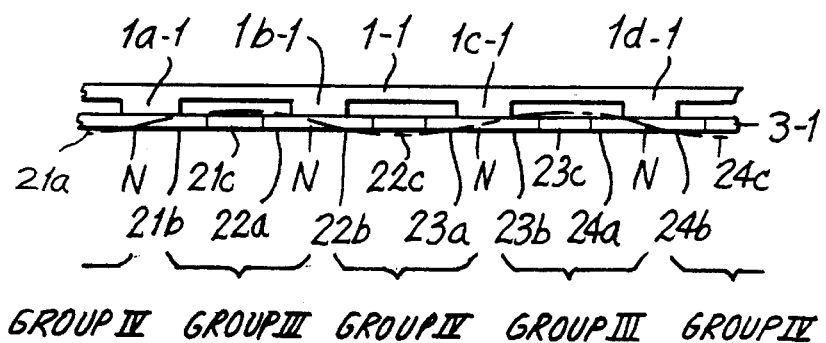
Figure 6C:
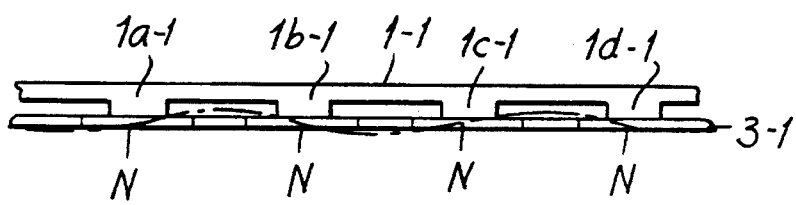
Figure 6D:
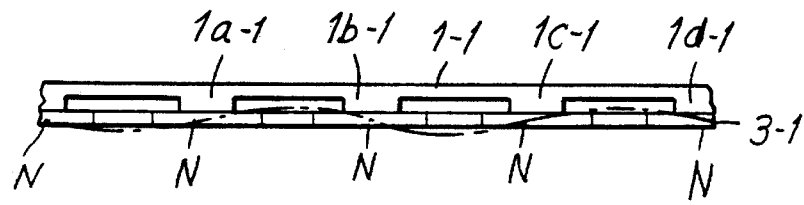

Referring now to FIG. 6b, the vibrators 21b, 21c, 22a, 23b, 23c and 24a form one group and the vibrators 22b, 22c, 23a, 24b, 24c and 21a form another group. Then, as the vibrators are driven such that the two groups are displaced in the opposite direction to each other, a node N is formed between the vibrator pair 21a and 21b, between the vibrator pair 22a and 22b, between the vibrator pair 23a and 23b and the vibrator pair 24a and 24b. As compared with FIG. 6a, the position of each node N is shifted to the right by an amount corresponding to one vibrator so that the contact positions of the projections 1a-1 through 1d-1, or the position of the rotor 1-1, is changed in a stepwise manner. By thus successively changing the vibration mode as shown in FIGS. 6c and 6d, rotor 1-1 is moved stepwise.

Figure 9:
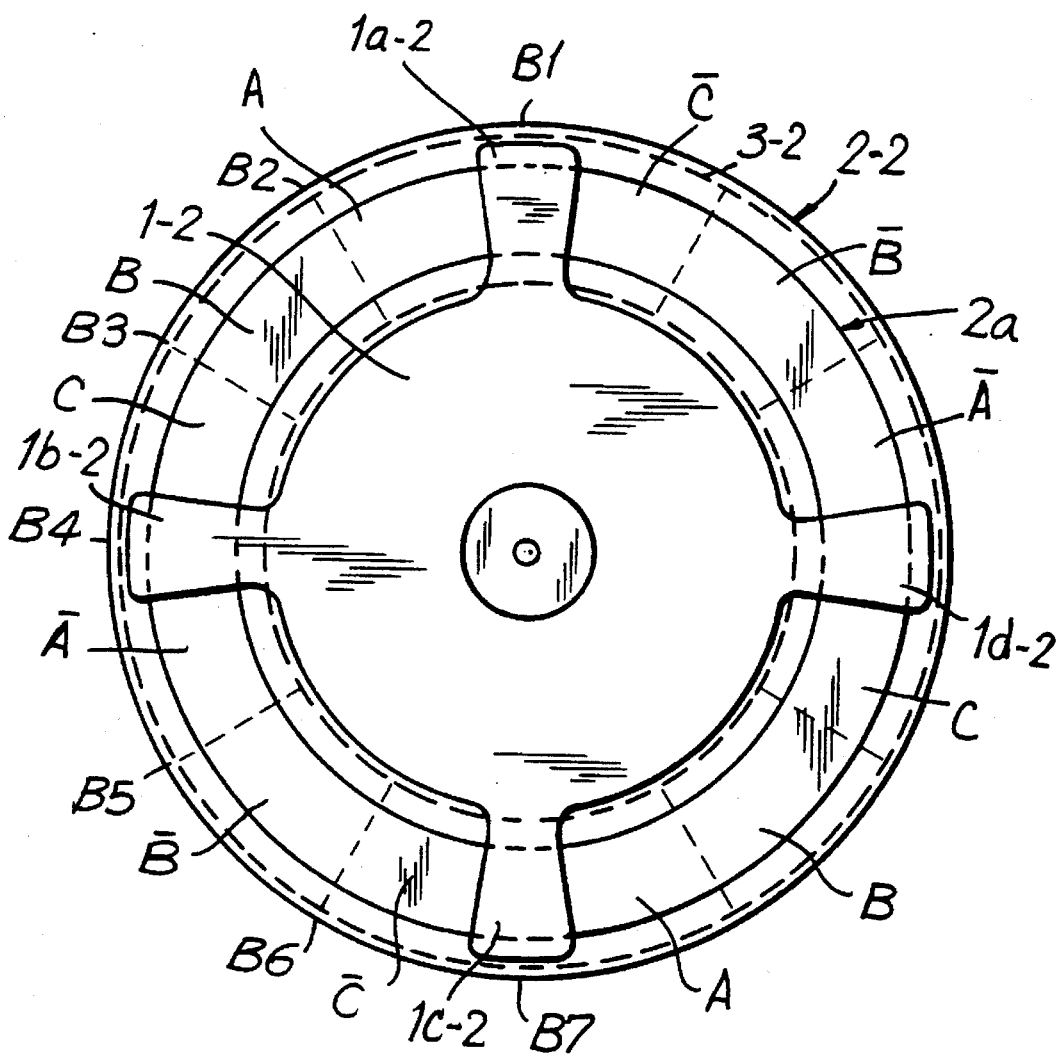
FIG. 9 is a top plan view of an ultrasonic step motor constructed in accordance with another embodiment of the invention.

Reference is now made to FIG. 9 in which an ultrasonic step motor for a rotary-type motor constructed in accordance with another embodiment of the invention is provided. Like numerals are utilized to indicate like structures. In this embodiment, a projection 2a is formed along the entire circumference of stator 2-2 and projections 1a-2 through 1d-2 are formed on a rotor 1-2 projecting diametrically from the center of rotor 1, projection 2a extending towards rotor 1-2.

Each of the constructions illustrated in FIGS. 7 and 9 correspond to an ultrasonic motor in which the rotor 1 and the stator 2 are brought into contact at four places (at the four projections). Also, a vibrating unit 107 composed of a piezoelectric unit 3 includes twelve vibrators as shown by the broken lines and they are designated by symbols A, B, C, $\overline{A}$, $\overline{B}$ and $\overline{C}$, respectively, thereby applying the same drive voltage to each pair of the same symbol. Also, symbols B1 through B7 sequentially indicate the possible node position of the vibrations. In this embodiment, the nodes N are formed at four places and the number of places where nodes N can be formed is twelve along the circumference.

Figure 10:
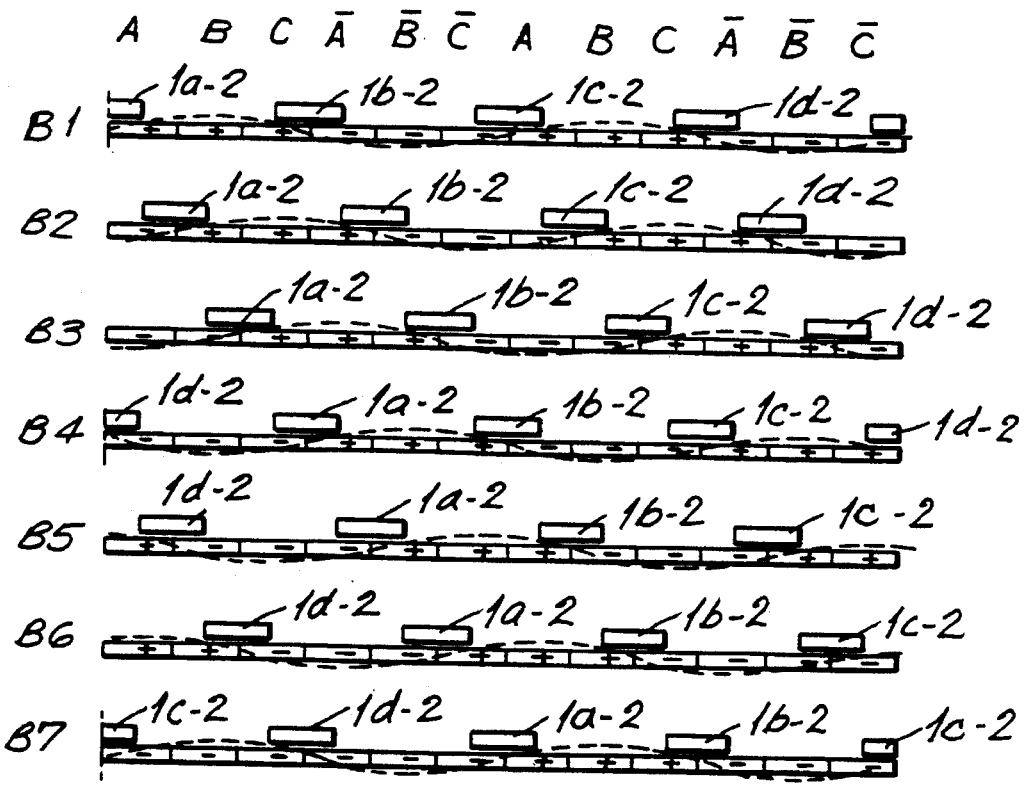
FIG. 10 is a diagram showing the conditions of the vibration mode during step driving of the ultrasonic step motor of FIG. 9.

Reference is now made to FIG. 10 which illustrates the manner in which the ultrasonic step motor is driven stepwise. The diagrams of FIG. 10 are linearly developed for purposes of description with the symbols corresponding to those of FIG. 9. The broken lines show the forms of the vibration modes and the phase conditions of the voltages applied to the respective vibrators at these instances are indicated by the signs "+" and "−" for purposes of simplification.

In the vibration mode of B1, the vibrators A, B and C and $\overline{A}$, $\overline{B}$ and $\overline{C}$, respectively, form groups which vibrate with a 180° phase difference therebetween and therefore the projections 1a-1, 1b-2, 1c-2 and 1d-2 of rotor 1-2 are placed in the illustrated positions. In the vibration mode of B2, the vibrators B, C and A and $\overline{B}$, $\overline{C}$ and $\overline{A}$, respectively, form groups, whereas in the vibration mode of B3, the vibrators C, A and B and $\overline{C}$, $\overline{A}$ and $\overline{B}$, respectively form groups. In this way, the vibration modes of B3 through B6 are repeated and the rotor 1-2 is moved in a stepwise manner. In the rotary type motor of FIG. 9, one rotation is completed by twelve steps.

Conversely, if the rotor is moved in steps in the opposite direction to the illustrated vibration modes of B1 through B6, that is, if switching is effected so that the vibration mode of B2 is obtained after the vibration mode of B3, the rotor 1-2 is moved in a direction opposite to that described above. As is apparent from the description of FIG. 10, it will be seen that the ultrasonic step motor can be easily constructed as a linear motor.

Figure 11:
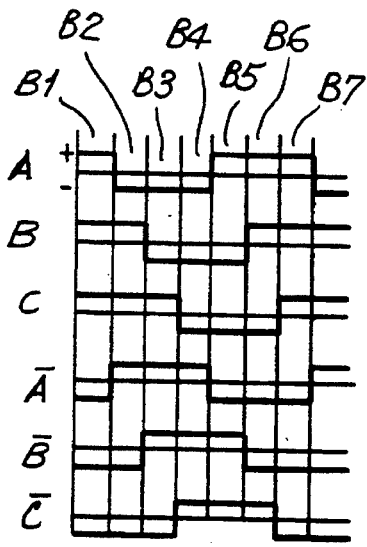
FIG. 11 is a timing chart of the phases of the drive voltages of the ultrasonic step motor of FIG. 9.

Reference is now made to FIG. 11, a timing chart of the phases for providing the vibration modes shown in FIG. 10. To produce the vibration modes of B1, the drive voltages of the positive (+) phase are applied to the vibrators A, B and C and the drive voltages of the negative (−) phase are applied to the vibrators $\overline{A}$, $\overline{B}$ and $\overline{C}$. These drive voltages are produced by control circuit 103 so that if the output signal 105a from the oscillation circuit 105 has the positive (+) phase, the oppositely phased output signal 106a of the output signal 105a of the oscillation circuit 105 has the negative (−) phase and switching is effected at the timing of the control signal 102a from the frequency divider circuit 102. It is to be noted that while six different kinds of drive control signal 103a are necessary for vibrators A, B, C, $\overline{A}$, $\overline{B}$ and $\overline{C}$, an inverse relationship exists between vibrators A and $\overline{A}$, between B and $\overline{B}$, and between C and $\overline{C}$, and therefore the equivalent operation can be obtained with three distinct drive control signals by reversing the direction of polarization.

Figure 12:
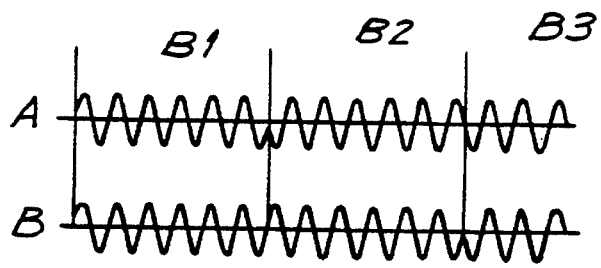
FIG. 12 is a timing chart of the drive voltages of the ultrasonic step motor of FIG. 9.

Reference is now made to FIG. 12, a timing chart of the drive voltages applied to vibrators A and B, respectively. As can be seen, the oppositely-phased drive voltages are applied to the vibrators A and B in the vibration mode of B2 and the drive voltage of the same phase are applied to the vibrators A and B in the vibration mode B3. At this time, the drive voltages in the respective vibration modes are sinusoidal waves and their frequencies are selected to coincide with the resonant frequency of the vibrators attached to the stator.

As will be seen from the foregoing description, the phases, of the drive voltages applied to the respective vibrators are suitably switched so as to realize a twelve-divisions per rotation step driving.

Figure 13:
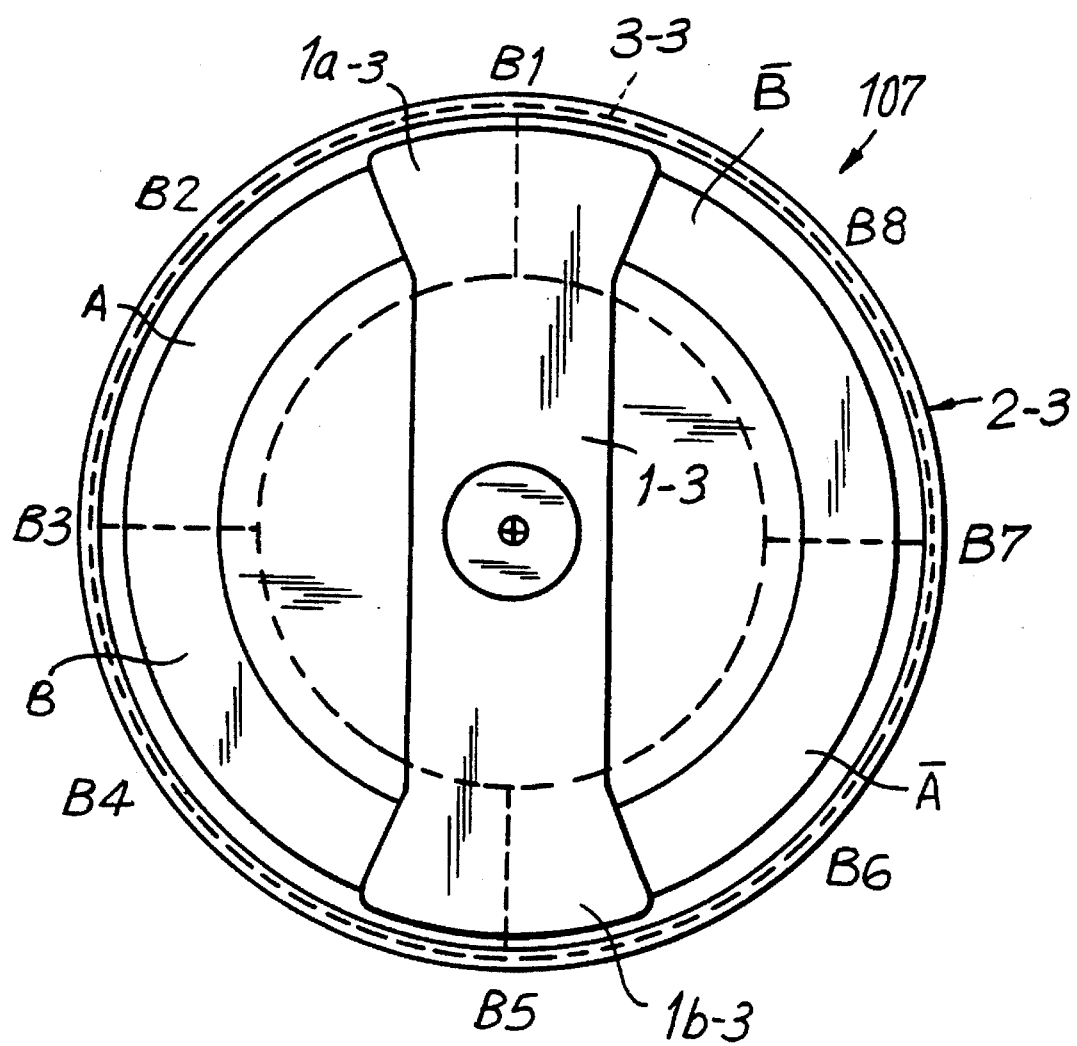
FIG. 13 is a top plan view of an ultrasonic step motor constructed in accordance with another embodiment of the invention.

Reference is now made to FIG. 13, in which an ultrasonic step motor constructed in accordance with another embodiment of the invention is provided. Like numerals are utilized to indicate like structure. Vibrating unit 107 includes four vibrators A, $\overline{A}$, B and $\overline{B}$. A rotor 1-3 contacts a stator 2-3 at two contacting portions 1a-3 and 1b-3. The number of nodes N is two and the number of positions where nodes N can be produced is eight.

Figure 14:
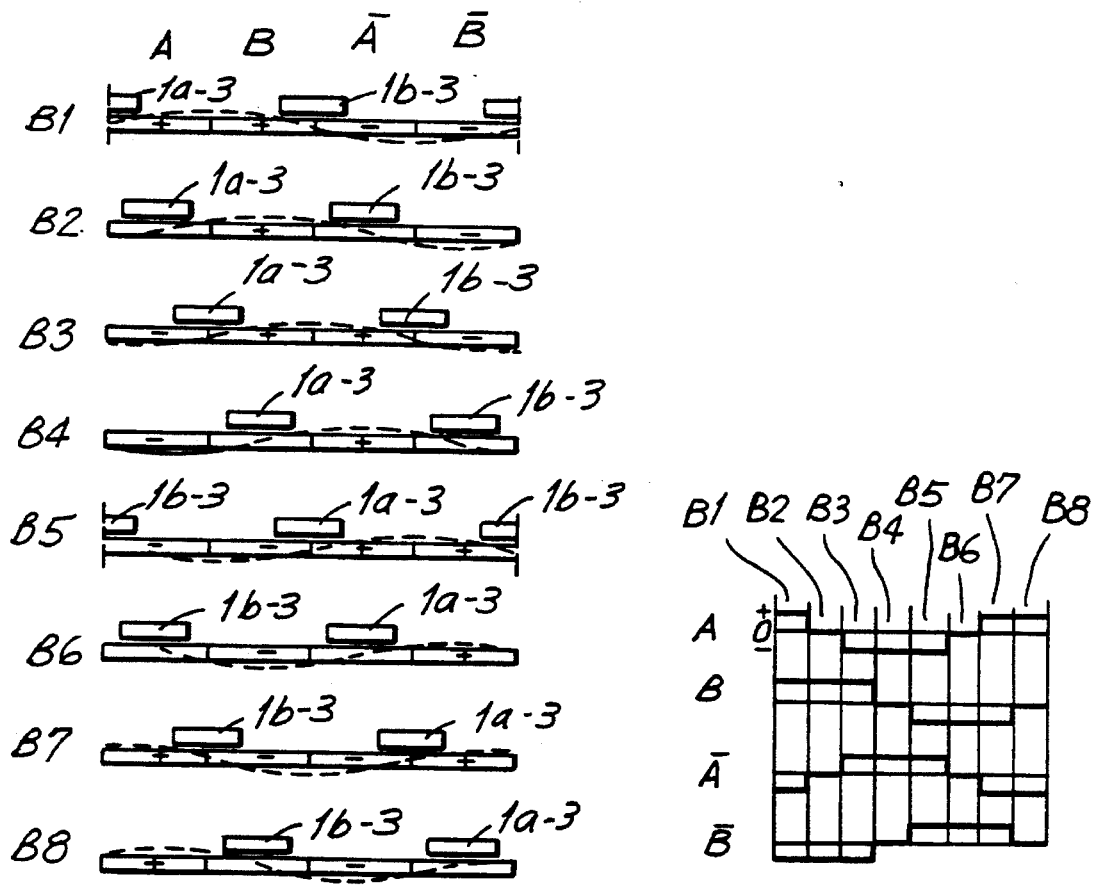
FIG. 14 is a diagram showing the vibration modes and the positional relations of the contact portions of the ultrasonic step motor of FIG. 13.
Figure 15:
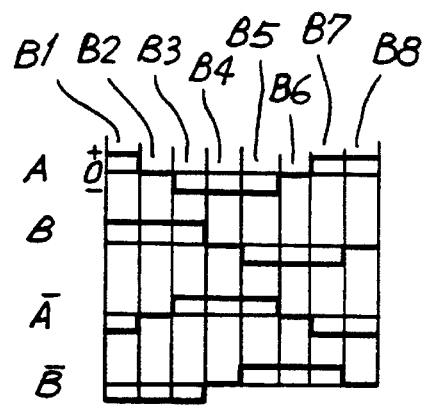
FIG. 15 is a timing chart of the phase of the drive voltage of the ultrasonic step motor of FIG. 13.

Reference is made to FIG. 14, showing the vibration modes and the positional relations of the contacting portions 1a-3 and 1d-3. FIG. 15 is a timing chart of the phases of the drive voltages for producing the vibration modes of FIG. 14.

Figure 16:
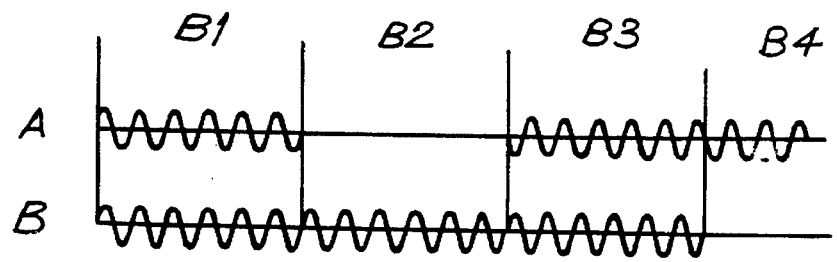
FIG. 16 is a timing chart of the drive voltages of the ultrasonic step motor of FIG. 13.

FIG. 16 is a timing chart of the drive voltages applied to the vibrators A and B. In FIG. 15, the signs "+" and "−" show the oppositely phased conditions and the absence of a sign indicates the condition where no drive voltage is applied. As a result, this embodiment realizes an ultrasonic step motor of eight-division steps (½ step) per rotation.

It is to be noted that while the above-described embodiment shows by way of example a rotary type motor, the invention is not limited with respect to this specific construction. The forms of vibration, the kinds and constructions of vibrators are applicable to other motors provided that the rotor is shifted to the driving nodes and the one driving manner of the vibrators is sequentially changed thereby moving the rotor in a stepwise fashion. In addition, the oscillation circuit 105 may be adapted to utilize the output of the crystal oscillator circuit 101 and also it may be a self-excited oscillation circuit which detects the vibrations of the vibrating unit 107 to resonate under the optimum conditions. Also, there will be no inconvenience even if the control signal 102a is not based on the signal from the crystal plate 100.

Further, after the ultrasonic step motor has been moved to the desired position, friction exists due to the friction forces acting between the rotor and the stator and therefore the rotor's stop position is maintained even if driving is stopped. As described hereinabove, the ultrasonic step motor can be suitably preset, its step angle depending on the number of vibrators and the driving method. The present invention is in no way limited to the previously mentioned embodiments.

Reference is now made to FIG. 17 in which a circuit diagram for a drive control apparatus for an ultrasonic step motor is provided for describing the drive control system. As discussed above, the drive system includes a control circuit 103, a phase inverting circuit 106 and a drive 104.

Control circuit 103 receives a signal $\phi_1$ corresponding to signal 102a output by frequency divider circuit 102. Signal $\phi_1$ is input to a shift register 110 and a ⅙ frequency divider circuit 109. ⅙ frequency divider circuit 109 divides the frequency of $\phi_1$ by six and provides an output to shift register 110. Shift register 110 outputs three $\phi\frac{1}{6}a$ signals, $\phi\frac{1}{6}a$, $\phi\frac{1}{6}b$, and $\phi\frac{1}{6}c$, respectively at time shifted intervals.

An inverter 121 receives the $\phi\frac{1}{6}a$ signal and produces an inverted signal 201. Similarly, an inverter 122 receives signal $\phi\frac{1}{6}b$ and produces an inverted signal 202 and inverter 123 receives $\phi\frac{1}{6}c$ and outputs an inverted signal 203. Simultaneously, phase inverting circuit 106 receives a clock signal $\phi_r$, on line with signal 105a and passes the signal through an inverter 127 and outputs a phase inverted signal $\overline{\phi_r}$.

Control circuit 103 includes a plurality of AND gates 131–136. AND gate 131 receives as one input $\phi\frac{1}{6}a$ and as its other input the inverted signal $\overline{\phi_r}$ output by phase inverting circuit 106 and produces a signal 204. AND gate 132 receives the output of inverter 121, the inverted $\phi\frac{1}{6}b$, as one input and the output of oscillation circuit 105, $\phi_r$ as its second output and outputs a signal 205. AND gate 133 receives signal $\phi\frac{1}{6}b$ as one input and the inverted signal $\overline{\phi_r}$ as its second input. AND gate 134 receives the inverted signal 202, inverted $\phi\frac{1}{6}b$, as its one input and the signal $\phi_r$ as its second input. AND gate 145 receives the signal $\phi\frac{1}{6}c$ as its one input and the inverted signal $\overline{\phi_r}$ as its second input. Lastly, AND gate 136 receives the inverted signal 203, the inverted $\phi\frac{1}{6}c$ as one input and signal $\phi_r$ as its second input.

The outputs of the AND gates are then gated a second time by OR gates 141, 142, 143. Specifically, the outputs of AND gates 131, 132 corresponding to signals 204, 205 respectively are the inputs for OR gate 141. Similarly, the outputs of AND gates 133, 134 provides the inputs of OR gate 142. AND gates 135, 136 provide the inputs for OR gate 143.

The outputs of OR gates 141, 142 and 143 are in fact utilized to drive vibrators 108 A, B, C, $\overline{A}$, $\overline{B}$ and $\overline{C}$ of vibrating unit 107. As discussed above, only three signals need be utilized to drive all twelve vibrators. Accordingly, the outputs of OR gates 141, 142 and 143 are utilized to drive all twelve vibrators 108 of vibrator unit 107. Specifically, OR gate 141 outputs a signal 206 which is input to an amplifier 151 of driver 104 and is passed through an inverter 124 to a second amplifier 154 of driver 104. Amplifier 151 and amplifier 154 provide signals which are the inverted version of each other. Accordingly, amplifier 151 provides an input to both vibrators 108 which are designated as A. Similarly, the output amplifier 154 provides an output to drive both vibrators 108 designated at $\overline{A}$. Similarly the output of OR gate 142 is directly input to driver 104 and is passed through an amplifier 152 to vibrators 108 indicated as B as well as being inverted by an inverter 125 which in turn passes through an amplifier 155 for driving vibrators 108 indicated as $\overline{B}$. The same is also true of OR gate 143 which provides an output which is directly input to driver 104 and amplified by amplifier 153 for driving vibrators 108 indicated as C as well as having its signal inverted by an inverter 126 prior to the input to driver 104 and amplified by an amplifier 156 coupled to vibrators 108 indicated as $\overline{C}$.

This embodiment shows by way of example a circuit construction for one-step (30°) per second driving of an ultrasonic step motor having a 2λ vibration mode for twelve-division steps per rotation. Although not shown in FIG. 17, the crystal oscillator circuit 101 and the frequency divider circuit 102 of FIG. 1 may utilize the same circuit construction conventionally known from electronic watches. Oscillation circuit 105 may include by way of example a CR oscillation circuit or self-excitation oscillation circuit.

Reference is now made to FIG. 18, a timing chart showing the operation of the drive control apparatus of FIG. 17. A 1 Hz control signal ϕ1 is output by frequency divider circuit 102. ⅙ frequency divider circuit 109 generates a signal subjected to ⅙ frequency division and the signal is input to shift register 110. Thus, shift register 110 generates ⅙ Hz signals ϕ⅙a, ϕ⅙b and ϕ⅙c which are shifted in phase by 1 second from one another and which are each shifted in phase every 3 seconds.

Then, the signal ϕ⅙a is input to AND gate 131 and is also inverted by the inverter 121 thereby applying the resulting signal 201 to AND gate 132. The output signal $\phi_r$ of the phase inverting circuit 106 is input to AND gate 131. AND gate 132 also receives the oscillation signal $\phi_r$ from the oscillation circuit 105. As a result, AND gate 131 generates an output signal 204 representing the logical product of the signal ϕ⅙a and the output signal $\overline{\phi}_r$. The AND gate 132 generates an output signal 205 representing the logical product of inverted signal 201 of the signal ϕ⅙a and the oscillation signal $\phi_r$. Then, these output signals 204 and 205 are supplied to the amplifier 151 through the OR gate 141 whose output is also supplied to the amplifier 154 through the inverter 124.

The operation on signals ϕ⅙b and ϕ⅙c is the same as in the case of the signal ϕ⅙a so that after their inverted signals 202 and 203 have been obtained, the signals are processed in the same way as in the case of the signal 100 ⅙a. The resulting drive control signals, applied respectively to amplifiers 152, 153, 155 and 156, are respectively shifted in phase by 1 second with respect to the drive control signals to the vibrators A and $\overline{A}$. Thus, the driver 104 outputs six distinct drive voltages so that in response to the applied drive control signal, each of the amplifiers applies the drive voltage vibrating at the frequency of the oscillation signal $\phi_r$ to the vibrators 108 thereby momentarily driving two vibrators 108 at a time. As a result, vibrators 108 are driven three times, in the same phase or the opposite phase so that the flexure vibrations of 2λ are produced and these vibrations drive the rotor 1 in a stepwise manner.

It is to be noted that ideally the drive voltages should be sinusoidal waves so that in order to do so, a filter circuit (not shown) for passing the frequency component of the oscillation signal $\phi_r$ is arranged after driver 104 thereby converting the drive voltages to sinusoidal waves.

FIG. 19 is a sectional view showing an embodiment of an electronic watch 500 having an ultrasonic step motor as a converter of electrical energy to rotational energy. As discussed above, the ultrasonic step motor includes a pinion 7-2 mounted on a rotor 1-2. A forward-end pivot 7a is radially guided by a jewel bearing 30 assembled in wheel train support 5. Pivot 7a is biased in its axial direction by a press spring 9 fixed in place by a fastening screw 9a. A stator 2-2 is fixed to a ground plate 4 by fastening screw 6 through a flange 31. Projections 2a are formed on stator 2-2 and contact rotor 1-2. A piezoelectric element 3 is provided below stator 2.

Pinion 7-2 is smaller in diameter than the rotor 1-2. A fourth wheel 32 rotatably mounted on wheel train supports meshes with pinion 7-2 so that the rotation of rotor 1 is transmitted to the succeeding wheel trains of the hands (seconds, minute and hour hands). Pinion 7-2 meshing with fourth wheel 32 reduces the rotation of rotor 1-2.

The timekeeping structure of watch 500 includes a fourth pinion 33 mounted coaxially with fourth wheel 32 about a drive shaft 81 to rotate with fourth wheel 32. A seconds hand 40 is mounted on the fourth pinion 33.

A third wheel 34 is rotatably mounted between a second wheel train support 42 and ground plate 4. A third pinion 35 is mounted coaxially with third wheel 34 and rotates therewith. A center wheel 37 rotatably mounted about shaft 81 meshes with third pinion 35. Third wheel 34 meshes with fourth pinion 33. Center wheel 37 is coupled to a minute hand 41, driving minute hand 41 as center wheel 37 is rotated. A second pinion 36 is mounted on ground plate 4 and rotates at a decelerated rate. A cannon pinion 38 having an hour hand 39 mounted thereon is driven by second pinion 36. The rotational speed of pinion 7 is stepped down by the meshing of the various gears to enable driving of respective indicating hands 39, 40, 41 at respective speeds.

While three indicating hands are used in this embodiment, in the case using the two hands (only the hour hand and the minute hand) it is only necessary to decelerate the movement of the fourth pinion 33 in a single stage, thereby driving the cannon pinion 38.

In the construction described, the movement of rotor 1-2 is decelerated to drive the hands such as the seconds hand. This results in requiring only a low positioning accuracy and increasing the tolerance for any turning moment applied from the hands due to shock or the like. Also, since rotor 1-2 is radially guided at only one place, i.e., by jewel bearing 30 and the guide in the height direction is effected by the projections 2a, stable positioning can be easily obtained. Further, the arrangement of third wheel 34 below fourth wheel 32 eliminates the need to increase the planar size of watch 500. The wheel trains for driving the hands 39, 40 and 41 can be provided by the application of various types of wheel trains and the present invention is in no way limited to this embodiment.

Reference is now made to FIG. 20, in which a sectional view of an electronic watch 502 utilizing an ultrasonic step motor constructed in accordance with the invention is provided. Like numerals are utilized to indicate like structure, the difference between watch 302 and watch 300 being the use of overhanging circuitry for providing electric contact with piezoelectric vibrators 3-2.

Electronic watch 502 includes a circuit board 45 mounted on ground frame 4. A circuit pattern 46 is formed on circuit board 45 with overhang portions 47 extending beyond circuit board 45 to overlap piezoelectric unit 3-2. Overhang portions 47 are resiliently pressed against electrode patterns 3a of piezoelectric unit 3-2 so that voltages from the circuit (not shown) are applied to the electrode patterns 3a-2. Thus, stator 2-2 is caused to vibrate in the flexure mode of vibration and rotor 1-2 is rotated by the circumferential vibration force components at the projections 2a. This turning force drives pinion 7-2 of rotor 1-2 which in turn drives fourth wheel 32 engaged with the seconds hand. The turning force also drives through the third wheel 34, center pinion 36 which is engaged with the minute hand. Then, after the rotary speed has been decelerated further, cannon pinion 38 engaged with the hour hand is driven.

Reference is now made to FIG. 21 in which a plan view showing the relationship between the circuit patterns, the overhang portions and the vibrators of watch 502 is provided. The dotted lines show the positional relation between piezoelectric unit 3-2 and the electrode patterns 3a-2. The piezoelectric unit 3 is divided into a plurality of vibrators 108 (twelve vibrators in this embodiment) and each of the vibrators 108 has a separate electrode pattern. Therefore, there are as many circuit patterns 46 arranged on circuit board 45 as there are electrode patterns. As a result, vibrators 108 can be driven independently of each other. Of course, the number layout, form, etc., of the electrode patterns 3a-2 and the circuit patterns 46 are not limited to the present embodiment.

With the construction described above, if stator 2-2 is mounted with the overhang portions 47 being turned up and stator 2 is fixed in place by fastening screw 6, the conduction between the electrode patterns 3a-2 and the circuit patterns 46 is easily established during assembly by the spring force of overhang portions 47. Even if there are any variations in the height of the turned-up overhang portions 47, overhang portions 47 are easily deformed thus preventing any detrimental effects such as the occurrence of distortions in stator 2-2.

Reference is now made to FIG. 22 in which a sectional view showing an electronic watch 504 constructed in accordance with another embodiment of the electric conducting structure of the ultrasonic step motor is provided. Like numerals are utilized to indicate like structures disclosed above. The difference in this embodiment being the use of a conductive material 51 attached to each distal end 50 of overhang 47. Distal end 50 is where overhang portions 47 of circuit patterns 46 are brought into contact with respective electrode patterns 3a-2. This results in enhanced conducting reliability. Also, on the external edges of stator 2-2, where the vibration amplitude is large, rotor 1-2 is in contact with the projections 2a and both are adapted to operate even with increases in the circumferential vibration amplitude. The broken lines show the deformed conditions of the stator 2-2. However, contacting distal ends 50 are provided at places where the vibration amplitudes are small as seen in FIG. 22. While this is also true of watches 500, 502 in this construction the electric contacts with circuit patterns 46 are not affected by the vibrations.

Reference is now made to FIG. 23 in which a sectional diagram showing an electronic watch 506 constructed in accordance with still another embodiment in which of the electric conduction structure of the ultrasonic step motor is provided. Like numbers are utilized to indicate like structures. This embodiment differs from the previous embodiment in that stator 2-1 is in contact with projections 1a-1 formed on the lower surface of the disk-type rotor 1-1 as defined in connection with FIG. 7. The broken lines show examples of the displaced condition during vibrations and the illustrated case shows the vibration mode with nodal circles M. Portions of the nodal circles M do not vibrate and therefore the overhang portions 47 of the circuit patterns 46 are in contact with the electrode patters 3a-1 of the piezoelectric unit 3-1 at nodal circles M. Also, rotor 1-1 and the stator 2-1 are in contact at the portions of the vibration anti-nodes. In this embodiment, even if the overhang portions 47 are strongly forced into contact with piezoelectric unit 3-1, there is no effect on the vibrations and thus the conduction reliability is enhanced.

Reference is now made to FIG. 24 in which a sectional view showing an electronic watch 508 constructed in accordance with still another embodiment of the electronic conduction structure of the ultrasonic step motor is provided. Again, like numerals are utilized to illustrate like structures. This embodiment differs from the previous embodiment in that the conducting reliability is further improved by attaching a conductive agent 51, e.g., conductive adhesive or solder to each distal end 50 of overhang portion 47. Even in this embodiment, due to the attachment of conductive agent 51 to overhang portions 47 at the vibration nodal circles M of stator 2-1, the mass of the conductive agent 51 has no effect on the vibrations.

Reference is now made to FIG. 25 in which a sectional view showing an electronic watch 510 constructed in accordance with still another embodiment of the electric conducting structure of the ultrasonic step motor is provided. Like numerals are utilized to indicate like structure. This embodiment utilizes the same vibration mode as watches 506 and 508. The difference being the replacement of overhang portions 47 with projections 52.

Rotor 1-1 and stator 2-1 are brought into contact with each other at the vibration anti-nodes. Projections 52 are disposed within circuit patterns 46 of circuit board 45. Each projection 52 is formed at one of holes 45a provided in circuit board 45. With this construction, by fastening the stator 2 in place with the fastening screw 6, the projections 52 are sandwiched by ground plate 4 and the electrode patterns 3a-1 thereby ensuring conducting. The contacting of stator 2-1 with rotor 1-1 at the anti-nodes further insures that projections 52 are in contact with electrode patterns 39. In this case, any variations in the height of projections 52 are tolerated by the plastic deformation and elastic deformation of the projections 52.

Reference is now made to FIG. 26, a plan view showing the relation among the circuit patterns, the projections and the vibrators of watch 510. The positions of circuit patterns 46 and the projections 52 which are formed on the circuit board 45 correspond to the electrode patterns 3a-2 of the piezoelectric unit 3-2 which are indicated by the broken lines. While the number of vibrators 108 in this case is twelve as shown in FIG. 21, the present invention is not limited to this embodiment.

Reference is now made to FIG. 27, in which a sectional view showing an electronic watch 512 constructed in accordance with still another embodiment of the electric conducting structure of the ultrasonic step motor is provided. Like numerals are used to indicate like structure. This embodiment utilizes the same vibration mode as watch 504 as well as the same stator 2. The difference between watches 512 and 504 being the use of bumps in overhang portion 47.

Overhang portion 47 extends to the center of stator 2-2. Bumps 53 are provided at the distal ends of respective overhang portions 47. Since the vibration amplitude of the stator 2-2 is low in the central portion, a current is supplied through bumps 53, and the overhang portion 47 of the circuit patterns 46 formed on the circuit board 45, to the inner diameter side of electrode patterns 3a-2 of piezoelectric unit 3-2. In an exemplary embodiment bumps 53 may be made of solder, gold, conductive adhesive or the like and the electrode patterns 3a-2 and the overhang portions 47 are fastened together to effect the electric conducting. As a result, bumps 53 are held to electrode patterns 3a-2 and variations in the height direction are accommodated by the elastic deformation and plastic deformation of overhang portions 47. This construction has a high degree of freedom for position setting in the height direction and the electric conducting is positively ensured.

It is to be noted that with the electric conducting structure of the ultrasonic step motor constructed in accordance with the invention, the only requirement for the structure is that electrode patterns 3a-1 or 3a-2 and circuit patterns 47 are elastically brought into contact so as to provide electric conduction therebetween and the invention is not limited to the above-mentioned embodiments. Also, the modes of vibration are not limited to the previously mentioned embodiments.

Reference is now made to FIG. 28 in which a top plan view of a stator 2-2 of an ultrasonic step motor constructed in accordance with the present invention is provided. The two-dot chain line indicates rotor 1-2 and the broken lines indicate the boundaries E1 to E12 of the twelve electrode patterns. The projections 2a increase the circumferential vibration displacements of the stator 2-2 and they also contact with the rotor projections 1a-2 through 1d-2. The boundary of each electrode pattern 3a is positioned at the center of the separation gap G between adjacent projections 2a. With this construction, the twelve division patterns are formed into four groups each including three adjoining patterns so that the opposing groups are driven in the same phase and the adjacent groups are driven in opposite phase thereby causing a vibration of stator 2-2 in a direction substantionally orthogonal to the plane of stator 2-2 (the number of nodes is 4). For instance, if the patterns are divided at the boundaries E1, E4, E7 and E10, respectively, the vibrations having nodes at the boundaries E1, E4, E7 and E10, respectively, are produced as shown in FIG. 9.

As seen in FIG. 29 the ultrasonic step motor of disk-type stator 2-2 which may be explained linearly. Projections 1a-2 to 1d-2 of rotor 1-2 are brought into contact with projections 2a of stator 2-2 at the four positions corresponding to each respective projection. Vibration nodes $N_1$, $N_2$, $N_3$ and $N_4$ are formed at four places. The broken lines show the opposite vibration phase state to the solid lines. With this construction, when rotor 1-2 is moved and stopped, the force of inertia is present so that as, for example, the projection 1b-1 is alternately subjected to driving forces 55a and 55b from projections 2a-1 and 2a-2 and the forces are balanced thereby stopping projection 1b-2. As a result, the projections 1a-2 through 1d-2 at their respective four positions are respectively stopped at the positions of the nodes $N_1$, $N_2$, $N_3$ and $N_4$. Also, if any deviation is caused between the position of the projection and the position of the node, the projection is subjected to only the driving force in one direction and the projection is moved until the positions of the projection and node are in register.

FIG. 28 shows the condition where the nodes are formed at the boundaries E1, E4, E7 and E10 and the projections 1a-2 to 1d-2 are respectively moved thereto. Then, if the combinations of the patterns to be driven are shifted by one and driven, rotor 1-2 is driven stepwise by an amount corresponding to the shifting of the nodes. On the contrary, if the combinations of the patterns to be driven are shifted in the reverse direction, that is, the nodes are shifted to E3, E12, E9 and E6, rotor 1-2 is rotated in the reverse direction.

Reference is now made to FIG. 30 showing in detail the projections 2a of stator 2-2. Stator projections 2a are arranged so that electrode pattern boundaries E1–E12 are disposed between adjacent pairs of stator projections 2a. The width W of each of the projections 1a-2 to 1d-2 of rotor 1-2 is selected to be wider than a gap h between the inner edges of adjacent projections 2a of stator 2 but smaller than a width H which extends between the outer edges of adjacent projections 2a of stator 2-2.

When vibrations are caused in stator 2-2, the driving force is applied to the projections 1a-2 through 1d-2 of the rotor 1-2 which are in contact with the contact surfaces 56 of stator projections 2a so that each of the projections 1a-2 through 1d-2 is stopped at a position at which displacements of adjacent projections 2a which are positioned on both sides of each vibration node are balanced against each other with respect to a projection 1a-2 through 1d-2. As shown in FIG. 29, the rotor projections 1a-2 through 1b-2 are each subjected to the driving forces 55a and 55b so that it is always stopped by the forces arising from contacting two adjacent stator projections 2a. There is no possibility of it being stopped by the application of the force from only one side.

Thus, referring again to FIG. 30, each of the rotor projections 1a-2 through 1d-2 is always stopped by contacting the two adjacent stator projections 2a which are disposed on either side of each vibration node. In other words, rotor 1-2 is stopped within a range in which the rotor projection does not deviate from at least one of the stator projections, that is, each of the rotor projections 1a-2 through 1d-2 is not stopped in such a manner that one portion of the rotor projection does extend within gap h thereby breaking contact with at least one stator projection 2a. Here, if the width W of each rotor projection is selected (h+t), each end of the rotor projection is stopped within the width t of the stator projection 2a with which it is in contact and its positional accuracy becomes t/2. Thus, the smaller the stator projection width t, the greater will be the stopping positional accuracy.

While the above-described embodiment shows the case of the rotary-type ultrasonic step motor, it is possible to construct a similar motor even in the case of a linear-type ultrasonic step motor and the invention is in no way limited to this embodiment with respect to the number of nodes, the number of projections, or the like, provided that the positions of the stator nodes correspond to the positions of the rotor projections.

Reference is now made to FIG. 31 in which a stator 2-2' having stator projections 2a' constructed in accordance with another embodiment of the invention is provided. Stator projections 2a' are provided with shoulder surfaces 56'. As shown, the convex width on the whole of each stator projection 2a' need not be uniform and it is only necessary that the width t of the contact surface 56 with which the rotor projections 1a-2 through 1d-2 interact attains the magnitude of the previously mentioned projection width. Also, the shape of each projection 2a' may take any form within the previously mentioned limitations.

Reference is now made to FIGS. 32–36 in which an electronic watch 600 constructed in accordance with an embodiment of the invention incorporating the previously mentioned ultrasonic step motor utilizing stator 2-2 is provided. Like numerals from the previous embodiments are utilized to indicate like structure.

A ground plate 4 forms a base frame for watch 600. A circuit board 45 is mounted on the upper part of ground plate 4. Circuit board 45 is made of a flexible material. An IC 324 is mounted on circuit board 45 for generating electric signals. A crystal plate 325 mounted within circuit board 45 on ground plate 4 serves as a time reference generating source.

A button-type battery 321 serving as a power source is mounted on ground plate 4 by a spring portion of a circuit press plate 304 affixed to ground plate 4 by screw 326. Press plate 304 is pressed against the side of the battery 321 as shown in FIG. 36. A negative terminal 322 made of an elastic material is guided by a dowel formed in ground plate 4 to press against the negative plate of battery 321, thereby establishing a negative conductive path negative terminal 322 and battery 321. Additionally, negative terminal 322 is disposed between circuit board 45 and ground plate 4 so that negative terminal 322 is in contact with the negative path patterns of circuit board 45. The conductive contact between terminal 322 and circuit board 45 is established by fastening a second wheel train support 303 and circuit press plate 304 to ground plate 4 by screws 326 maintaining circuit board 45 in place and negative terminal 322 sandwiched therebetween.

To provide a positive pathway to battery 321, the positive plate of battery 321 is pressed by a battery holding spring formed on circuit press plate 304, thereby fixing the battery in place and establishing the positive conductive path. Also, the battery 321 is arranged at a position where it is not stacked above stator 2-2 forming a part of the stepping motor. By so doing, a reduction in size is realized with respect to the movement thickness.

As shown in FIG. 36, crystal plate 325 is arranged in a V-shaped inclined plane portion of ground plate 4. A positive pattern 45b formed to overhang from the circuit board 45 contacts crystal plate 325 to provide a contact therewith. Crystal plate 325 is fixed in place by the application of pressure through a spring portion extended from the circuit press plate 304. Also, a positive conducting path from crystal plate 325 to the circuits of the circuit board 45 is established by the lower positive pattern formed on circuit board 45.

As shown in FIG. 33, an ultrasonic step motor as discussed above is mounted within watch 600. A screw pin 327 is drive fitted into ground plate 4. Stator 2-2 is mounted about screw pin 327. A plurality of projections 2a are formed on the outer periphery of stator 2-2 for vibration amplification purposes. Rotor 1-2 is mounted on stator 2-2 such that projections 1a-2 and the like may come in contact with stator projections 2a. A piezoelectric unit 3-2 serves as vibrating unit and is adhesively fastened to stator 2-2 such that stator 2-2 is disposed between piezoelectric unit 3-2 and rotor 1-2.

A pinion 7 is mounted on rotor 1-2. A pinion pivot 7a is formed integrally with pinion 7 and extends through a jewel bearing 30 of a wheel train support 5 so that pinion 7 is positioned by jewel bearing 30 in the direction of the plane of wheel train support 5. As noted above, rotor 1-2 is formed with four planar projections 1a-2 through 1d-2. These projections are rotated by the vibration of projections 2a formed on stator 2-2. The driving method and operation of the ultrasonic step motor is in accordance with those methods and operations discussed above. With rotor 1-2 adapted for step driving, pivot 7a formed on pinion 7 extends through wheel train support 5 and is pressed from above by a rotor press spring 333 which is fastened to wheel train support 5 by a screw 326. This produces the required frictional force between stator 2-2 and rotor 1-2 to turn rotor 1-2 and pinion 7.

An opening 370 is formed in circuit board 45 which is concentric with but greater in diameter than the screw pin 327. A circuit pattern overhang 47, made of an elastic material, over hangs opening 370 and contacts through elastic deformation with each of the twelve vibrators of piezoelectric unit 3-2 thereby establishing a circuit. As discussed above, the circuit conductive path to piezoelectric unit 3-2 serving as a vibrating unit is provided in the central portion of piezoelectric unit 3-2 which does not contribute much to the vibrations reducing the effect of the vibration condition on the conductive efficiency. Thus, as in this embodiment, circuit board 45 is arranged on the side of the piezoelectric unit 3-2 so that there is no need for a complicated structure requiring soldering lead wires or the like making it possible to provide a simple structure based on the spring contacts as in the present embodiment. Further, due to the simplified structure, it is possible to reduce the number of component parts and also to decrease the thickness of the watch movement.

A fourth wheel 34 is rotatably mounted about a drive shaft 81 mounted between ground plate 4 and wheel train support 5. The step driven rotor 1-2 meshes through pinion 7 with fourth wheel 32 with a reduction ratio of ⅕. The fourth wheel 32 is positioned in a planar direction so as to lie in a stacked fashion with the rotor 1-2 but sectionally arranged above rotor 1-2 with a given gap therebetween. To arrange fourth wheel 32 and rotor 1-2 as in this embodiment allows for the rotor rotation to be transmitted utilizing a single speed reduction. On the contrary, if the rotation is transmitted to fourth wheel 32 by a plurality of speed reductions, the number of wheel trains will be increased and the planar size of the watch movement will be increased. Accordingly, to arrange the ultrasonic motor in the central position of the watch, so as to directly drive the watch, increases the thickness of the movement, and therefore the structure shifted in position as in the present embodiment is the optimum in terms of the movement size. In addition, the ultrasonic motor is capable of producing a high torque, and a higher torque can be produced by effecting speed reduction.

As shown in FIGS. 33 and 34, a fourth pinion 33 is integrally formed with fourth wheel 32. Fourth pinion 33 is utilized to drive the seconds hand in response to the step movement every second. A third wheel 34 is rotatably mounted between a jewel bearing 301a drive-fitted in ground plate 4 and a jewel bearing 303a drive-fitted in a second wheel train support 303. A third pinion 35 is integrally formed with third wheel 34. A center wheel 37 rotatably mounted about shaft 81 meshes with third pinion 35. Similarly, fourth pinion 33 meshes with third wheel 34 thereby transmitting the rotation of fourth pinion 33 to center wheel 37.

Third wheel 34 is arranged so that it is not stacked upon stator 2-2. If third wheel 34 is arranged below stator 2-2 as compared with the present embodiment, the thickness of watch 600 is increased by an amount corresponding to third wheel 34 and the second wheel train support 303 and consequently the thickness of the movement is increased.

The rotation of the third pinion 35 is transmitted to an hour indicating cannon pinion 38 through the minutes indicating center wheel 37 and a minute wheel 314 which meshes with center wheel 317 (FIG. 34). Minute wheel 314 is positioned so as not to be in a stacked relation with stator 2-2 thereby making it possible to reduce the movement thickness.

A winding stem 316, which is an externally operated member, is supported within a horizontal opening formed in ground plate 4 as shown in FIGS. 34 and 35. A joint 318, which is engaged and operatively associated with the winding stem 316, is rotatable about the center of rotation of a joint shaft 332 drive-fitted in ground plate 4. Joint 318 engages with a strong back 319 which is rotatable about a center of rotation dowel 510 of the ground plate 4 by virtue of the reaction force of the spring portion of the strong back 319, thereby positioning both the joint 318 and the strong back 319. Strong back 319 also engages the groove of an hourglass wheel 317 which is guided by an angular portion formed on winding stem 316 thereby positioning the hourglass wheel 317. A control lever 320 is rotatable about a ground plate dowel 512 as its center of rotation and engages a forward end portion of strong back 319 which is engaged with hourglass wheel 317.

When correcting the time indicated by the watch hands, winding stem 316 is withdrawn and operated so that in association with the rotary movement of the joint 318, the strong back 319 comes into operation thus producing a click which can be felt. Additionally, hourglass wheel 317 is disposed toward the center of watch 600 so as to engage with a pinion 315. A control lever 320 engaging with strong back 319 is caused to make a rotary movement so that the fourth wheel 32 is adjusted to stop the second hand thereby making possible the correction of the time. At the same time, the spring formed on a part of the control lever 320 comes into contact with the circuit board patterns thereby resetting the circuits. In this connection, winding stem 316 is rotated so that the hourglass wheel 317 is rotated and the correction of the rotation of the center wheel 37 is made possible through a pinion 315 and minute wheel 314. Also, these time correcting members are subjected to setting by the second wheel train support 303. While the time correcting structure of this embodiment is constructed mechanically, it is possible to use time correcting means employing electronic correction.

Since the rotation of the ultrasonic step motor is decelerated by use of the above mentioned construction to indicate the seconds, the accuracy of its rotational positioning is also improved and a higher torque is further obtained, thereby ensuring a satisfactory safety factor against shock due to the watch falling or the like. Also, due to the single speed reduction construction, the movement thickness and the planar size of the watch are reduced. Similarly, a further reduction in the movement thickness is made possible by arranging the transmission wheel train and the battery offset with the stator of the ultrasonic motor. In addition, due to the arrangement of the circuit board on the piezoelectric element side, the electric conducting structure of the circuit board is simplified, decreasing the number of component parts, decreasing the number of component processing operations and enhancing the watch reliability.

While the present embodiment has been described as applied to a three-hands watch, by conceiving a construction in which the fourth wheel 32 is used as a minute gear and the rotation is transmitted to the cannon pinion 38 from the minute gear through the minute wheel, it is possible to obtain the same effects even in the case of a two-hands watch.

Reference is now made to FIGS. 37–39 in which a watch 700 constructed in accordance with another embodiment of the invention incorporating an ultrasonic step motor is provided. Like numerals are utilized to identify like structure. The primary difference between watch 600 and watch 700 being the stacking of elements.

A center shaft 81 is drive-fitted in ground plate 4 at the center position of the watch. A minute indicating center wheel 37 is rotatably mounted on the upper part of center shaft 81. A third wheel 34 is rotatably supported between a jewel bearing 303a drive-fitted in a second wheel train support 303 serving as a wheel train support member and a jewel bearing 301a formed in ground plate 4. A third pinion 35 is integrally formed with third wheel 34 and meshes with center wheel 37. Minute wheel 314 is rotatably supported between bores formed in ground plate 4 and second wheel train support 303. A cannon pinion 38 rotatably mounted in ground plate 4 is driven by minute wheel 314 which in turn meshes with center wheel 37.

A stator 2-2' forming a part of the ultrasonic step motor of this embodiment, is drive-fitted into second wheel train support 303 at the center of the watch. A piezoelectric unit 3-2 serving as a vibrating unit is adhesively attached to stator 2-2'. Vibrations are caused in stator 2-2' by the application of fixed voltages to piezoelectric unit 3-2. Also a plurality of projections 2a for vibration amplifying purposes are formed on the outer periphery of the stator 2-2' and a rotor 1-2' is mounted on the projections 2a. Coplanar projections 1a-2' through 1d-2' are formed at each of four positions on the outer periphery of rotor 1-2' and these projections are rotated by the vibration of the projections 2a formed on the stator 2-2'.

The rotor 1-2' is integrally formed with a fourth pinion 33' so that the rotation of rotor 1-2' rotates fourth pinion 33 which in turn rotates third wheel 34 acting as a transmission for minute wheel 314 so as to indicate the seconds. A pivot 339 formed on fourth pinion 33 is rotatably supported in a jewel bearing 30 drive-fitted in a wheel train support 5 so that the position of pinion 33 is fixed in the direction of the plane of wheel train supports. Pivot 339 extends through jewel bearing 30 and its top is pressed by a fourth pinion press spring 418 which is fastened to wheel train support 5 with a screw 419, thereby providing the frictional force between the rotor 1-2' and stator 2-2' affecting the turning force of the rotor 1-2'.

Wheel train support 5 and the second wheel train support 303 are secured by screw pins 420 and 421 and are fixed in place with screws 419.

While the present embodiment illustrates an ultrasonic motor which is operated as a stepping motor, it is possible to operate the ultrasonic motor as a continuous drive motor driven by a traveling wave or the like.

Circuit board 45 is formed of a flexible material. IC 423 is mounted on circuit board 45 for generating electric signals. A crystal plate 424 is mounted on circuit board 45 and serves as a time reference generating source. Circuit board 45 is mounted on second wheel train support 303 in facing relationship with piezoelectric circuit 3-2. Circuit board 45 is formed with an opening 370 which is concentric with stator 2-2'. Overhang patterns 47, formed of an elastic member, hang over opening 370 and are brought into contact with the vibrators of piezoelectric unit 3-2 thereby providing a conducting circuit.

A battery 415 serving as a power source is mounted through an insulating sheet 416 on screws 419 which are arranged at several places of the movement. A circuit press plate 404 (FIG. 39) secured to wheel train support 303 by screws 419 supports the circuitry of watch 700. Press plate 404 includes vertically extending portions 404a which are arranged at three places on the outer periphery of battery 415 and have substantially the same height as battery 415 so that extended portions 404a apply a pressing force in the radial direction to battery 415 maintaining battery 415 in place as well as establishing the positive conducting pathway from the side of the battery positive electrode. Also, the negative conductive pathway is provided by establishing a spring contact between the lower surface negative electrode and a negative terminal 417 guided by a dowel (not shown) formed in second wheel train support 303 in the vicinity of a screw pin 422. Also, the electric conduction between negative terminal 417 and circuit board 45 is provided by fastening a screw 419 to the screw pin 422 through the wheel train support 5 and the circuit press plate 404.

While the present embodiment has been described as applied to the three-hands watch, it is possible to obtain the same effects even in the case of a two-hands watch.

By providing an electronic watch employing an ultrasonic step motor which is driven in a stepwise manner no variation in the amount of the watch's movement is caused. As a result, the movement of the hands driven by the motor is highly accurate.

By providing an electronic watch having a wheel train for driving hands indirectly by using an ultrasonic step motor and a pinion of a smaller diameter than the rotor of the ultrasonic step motor mounted on the rotor whereby the rotor is radially positioned by a pivot of the pinion and a spring member biases the forward end of the pinion against the rotor as well as decelerating the rotation of the rotor and then driving the hands, the positional accuracy of time indications and the shock impact resistance of the watch are improved. Also, since the rotor is radially at one place, there is no danger of causing any backlash and watch assembly is greatly facilitated.

By providing an electronic watch having an electric conducting structure for an ultrasonic step motor in which the circuit patterns of a circuit board are elastically pressed against the electrodes of vibrators, assembly is greatly facilitated. Also this electric conducting structure has no danger of deteriorating the characteristics of the vibrators and therefore has no effect on the vibrations.

By providing projections formed on a stator intermittently shifting the vibration nodes produced on the vibrators, causing a moving body in contact with the contacting surfaces of the projectors to move in a stepwise manner, and forming the contact surface of each projection with a width in the moving body travel direction which is smaller than the non-contacting width between the adjacent projections, and forming the width of each projection of the stator smaller than the gap between the adjacent projections, the stop position accuracy of the moving body is improved thereby realizing a highly accurate electronic watch.

By providing an electronic watch designed so that the rotational speed of an ultrasonic step motor is reduced to indicate the seconds thereby, a highly accurate indication is provided while producing a greater torque, ensuring a reduced voltage and reduced power consumption and remarkably improving the shock impact resistance. Also, by arranging a third gear, a minute gear and a battery in such positions that they do not overlap the stator when viewed in plan view, the watch becomes miniaturized and the movement is thinned, ensuring an ample variety of design possibilities of watches. Furthermore, by arranging a circuit board on a piezoelectric unit side, a simplified electric conducting structure is provided reducing the number of components while providing high reliability at reduced cost.

Lastly, by providing an electronic watch so designed that a battery is arranged on the upper part of a movement size is minimized as compared with the conventional electromagnetic-type motor watch. Also, the arrangement of the battery on the upper part of the movement has the effect of simplifying the operation of battery change and remarkably improving the quality of after sale servicing.

While the foregoing specification refers to a watch, the structures described thereon are applicable to the other forms of timepieces requiring a motor to drive a time indicating device such as hands.

It will thus be seen that the objects set forth above, among those made apparent from the preceding description are efficiently attained and, since certain changes may be made in the above construction set forth, without departing from the spirit and scope of the invention, it is intended that all matter contained in the above description and shown in the accompanying drawings shall be interpreted as illustrative and not in a limiting sense.

It also to be understood that the following claims are intended to cover all of the generic and specific features of the invention herein described and all statements of the scope of the invention which, as a matter of language, might be said to fall therebetween.

What is claimed is:

1. An electronic timepiece comprising:
   time indication means for providing a visual indication of time; and
   motor means for driving said time indication means, said motor means comprising a first member having portions selectively displaceable in a first direction; a second member moveable in a second direction substantially orthogonal to said first direction; and drive control means for applying a standing wave to said first member selectively displacing said first member portions, including a plurality of vibrator means, said vibrator means being operably coupled to said first member for displacing said first member portions; and said drive control means exciting each of said plurality of vibrator means causing said first member portions to vibrate as a standing wave in a first of a plurality of vibration modes and moving said standing wave along said first member in said second direction in a stepwise manner by selectively changing said vibration mode of said first member portions so that said first member portions selectively contact said second member causing said second member to move in said section direction.

2. The electronic timepiece of claim 1, wherein said second member rotates so that said second direction is substantially circular.

3. The electronic timepiece of claim 1, wherein each of said first and second members is formed with a surface facing the surface of the other member, said facing surfaces being shaped to cause the movement of the second member when selectively contacted by the surface of the first member.

4. The electronic timepiece of claim 1,
   wherein said first member includes a stator having said displaceable portions;

said second member including a rotor, said rotor having a plurality of radial projections, said projections being selectively contacted by said stator;

a plurality of vibrator means, at least one of said vibrator means being operably coupled to one of said displaceable stator portions for displacing said stator portions; and said drive control means exciting each of said plurality of vibrator means to form a standing wave in said displaceable portions of said stator, and phase shifting said standing wave to move said rotor in a stepwise manner.

5. The electronic timepiece of claim 4, wherein said plurality of vibrator means are sequentially arranged and said drive control means sequentially excites said plurality of vibrator means.

6. The electronic timepiece of claim 4, wherein said plurality of vibrator means are affixed to said stator, said stator being disposed between said rotor and said plurality of vibrator means.

7. The electronic timepiece of claim 4, wherein said plurality of vibrator means includes a piezoelectric member.

8. The electronic timepiece of claim 3, further comprising a pinion integrally mounted with said rotor, said pinion rotating with said rotor, a pivot formed on said pinion, wheel train support means, said pivot extending through said wheel train support means so that said rotor is supported in the direction of the plane of said wheel train support means and biasing means for biasing said rotor against said stator.

9. The electronic timepiece of claim 4, further comprising a circuit board, a circuit pattern mounted on said circuit board for coupling said drive control means to each of said plurality of vibrator means, each of said plurality of vibrator means including an electrode, said circuit pattern being formed of an elastically deformable material, said circuit pattern being elastically pressed against an electrode of each respective vibrator means.

10. The electronic timepiece of claim 9, wherein said circuit board is formed with a hole therein, said circuit pattern including a plurality of overhanging portions extending into said opening, said electrodes being disposed above said opening in facing relation with a respective one of said plurality of overhang portions.

11. The electronic timepiece of claim 10, wherein said overhang portion includes a distal end extending into said opening, said overhang portion being formed in a turned up curve so that said distal end extends towards said electrode to come in contact therewith.

12. The electronic timepiece of claim 11, further comprising a drop of conductive material formed at said distal end of each of said plurality of overhang portions.

13. The electronic timepiece of claim 12, wherein said plurality of vibrators is formed in substantially a circle and said distal ends of said plurality of overhang portions extend to an inner diameter of said plurality of vibrator means.

14. The electronic timepiece of claim 12, wherein said conductive material is an adhesive for securing said distal end of said overhang portion to a respective electrode.

15. The electronic timepiece of claim 9, wherein said circuit board is formed with a plurality of projections thereon said projections extending toward a respective electrode, a portion of said circuit pattern being formed on said projection to come in contact with a respective electrode to provide a conductive pathway therebetween.

16. The electronic timepiece of claim 10, wherein excitation of said plurality of vibrating means causes vibrational nodes to be formed on said plurality of vibrator means, said overhang portions contacting said plurality of vibrator means at said vibrational nodes.

17. The electronic timepiece of claim 4, wherein said stator is substantially formed as a circle, and includes a plurality of stator projections formed about the circumference of said circle extending toward said rotor, the distance between each adjacent stator projection pair being equal, each said stator projection having a contact surface for coming in contact with said rotor, the width of each contact surface in the direction of movement of said rotor being smaller than the distance between adjacent stator projections.

18. The electronic timepiece of claim 4, wherein said time indication means includes a seconds indicating means, a minutes indicating means and an hours indicating means, a fourth wheel for driving said seconds indicating means rotatably mounted on said wheel train support means and meshing with said pinion, said fourth wheel being disposed at the center of said timepiece, said fourth wheel rotating at a rotational speed which is stepped down from the rotational speed of said pinion by a predetermined ratio, a center wheel disposed at the center of said timepiece for driving said minutes indicating means, a third wheel for transmitting the rotational movement of said fourth wheel to said center wheel, a cannon pinion disposed at the center of said timepiece for driving said hour indicating means, and a minute wheel for transmitting the rotational movement of said center wheel to said cannon pinion, said fourth wheel overlapping said stator when viewed in plan and being disposed above said stator across a gap and said third wheel being disposed in a non-overlapping manner with said stator when viewed in plan.

19. The electronic timepiece of claim 18, wherein said center wheel is disposed overlapping said stator when viewed in plan and above said stator across a gap and said minute wheel is disposed in a non-overlapping manner with said stator when viewed in plan.

20. The electronic timepiece of claim 19, further comprising a power source, said power source including a battery, said battery being disposed within said timepiece so that said battery overlaps said stator when viewed in plan.

21. The electronic watch of claim 4, further comprising a circuit board, a circuit pattern mounted on said circuit board for coupling said drive control means to each of said plurality of vibrator means, each of said plurality of vibrator means including an electrode, said circuit pattern being formed of an elastically deformable material, said circuit pattern being elastically pressed against an electrode of each respective vibrator means.

22. The electronic timepiece of claim 21, wherein said circuit board is formed with a hole therein, said circuit pattern including a plurality of overhanging portions extending into said opening, said electrodes being disposed above said opening in facing relation with a respective one of said plurality of overhang portions.

23. The electronic timepiece of claim 22, wherein said overhang portion includes a distal end extending into said opening, said overhang portion being formed in a turned up curve so that said distal end extends towards said electrode to come in contact therewith.

24. The electronic timepiece of claim 23, further comprising a drop of conductive material formed at said distal end of each of said plurality of overhang portions.

25. The electronic timepiece of claim 24, wherein said plurality of vibrator is formed substantially in a circle and said distal ends of said plurality of overhang portions extend to an inner diameter of said plurality of vibrator means.

26. The electronic timepiece of claim 24, wherein said conductive material is an adhesive for securing said distal end of said overhang portion to a respective electrode.

27. The electronic timepiece of claim 21, wherein said circuit board is formed with a plurality of projections thereon, said projections extending toward a respective electrode, a portion of said circuit pattern being formed on said projection to come in contact with a respective electrode to provide a conductive pathway therebetween.

28. The electronic timepiece of claim 22, wherein excitation of said plurality of vibrating means causes vibrational nodes to be formed on said plurality of vibrator means, said overhang portions contacting said plurality of vibrator means at said vibrational nodes.

29. The electronic timepiece of claim 4, wherein said stator is substantially formed as a circle, and includes a plurality of stator projections formed about the circumference of said circle extending toward said rotor, the distance between each adjacent stator projections being equal, each said stator projection having a contact surface for coming in contact with said rotor, the width of each contact surface in the direction of movement of said rotor being smaller than the distance between adjacent stator projections.

30. The electronic timepiece of claim 8, wherein said time indicating means includes a minutes indicating means, an hour indicating means, a plurality of wheel trains operatively coupled to said pinion for driving said minutes indicating means and hours indicating means, a battery for driving said ultrasonic motor, wherein said wheel trains and ultrasonic motor are disposed at substantially the center of said electronic watch and said battery is disposed above said stator, overlapping said stator when viewed in plan.

31. The electronic timepiece of claim 8, wherein each of one said plurality of vibrator means are excited independently of another one of said plurality of vibrator means.

32. The electronic timepiece of claim 1, wherein said motor means is an ultrasonic motor.

33. The electronic timepiece of claim 1, further comprising a plurality of projections formed on said second member for coming in contact with said first member, said respective projections being separated by a first width from each other, said first width not coming in contact with the first member and each projection having a contact surface, the contact surface of each projection having a second width in the second direction which is smaller than the first width.

34. An electronic timepiece comprising a motor, said motor including a stator having displaceable portions;

a rotor, said rotor having a plurality of radial projections, said projections selectively contacting said stator to rotate said rotor;

a plurality of vibrator means, at least one of said vibrator means being operatively coupled to one of said displaceable stator portions;

drive control means for exciting each of said plurality of vibrator means, to form a standing wave in said displaceable portions of said stator, and phase shifting said standing wave to move said rotor in a stepwise manner;

a pinion integrally formed with said rotor and rotating therewith;

a pivot formed on said pinion;

wheel train support means, said pivot extending through said wheel train support means so that said rotor is supported in the direction of the plane of said wheel train support means;

biasing means for biasing said pivot in the direction of said rotor;

a seconds indicating means;

a minutes indicating means;

an hours indicating means;

a fourth wheel for driving said seconds indicating means rotatably mounted on said wheel train support means operatively coupled with said pinion, said fourth wheel being disposed at the center of said watch, said fourth wheel rotating at a rotational speed which is stepped down from the rotational speed of said pinion by a predetermined ratio;

a center wheel disposed at the center of said watch for driving said minutes indicating means;

a third wheel for transmitting the rotational movement of said fourth wheel to said center wheel;

a cannon pinion disposed at the center of said watch for driving said hour indicating means;

a minute wheel for transmitting the rotational movement of said center wheel to said cannon pinion, said fourth wheel overlapping said stator when viewed in plan and being disposed above said stator across a gap and said third wheel being disposed in a non-overlapping manner with said stator when viewed in plan;

a circuit board; and a circuit pattern mounted on said circuit board for coupling said drive control means to each of said plurality of vibrator means, each of said plurality of vibrator means including an electrode, said circuit pattern being formed of an elastically deformable material, said circuit pattern being elastically pressed against an electrode of each respective vibrator means.

* * * * *